US012659000B2

(12) United States Patent
    Lee et al.

(10) Patent No.: US 12,659,000 B2
(45) Date of Patent: Jun. 16, 2026

(54) METHOD AND APPARATUS FOR REPORTING CSI IN WIRELESS COMMUNICATION SYSTEM

(71) Applicant: Samsung Electronics Co., Ltd., Suwon-si (KR)

(72) Inventors: Deokhui Lee, Suwon-si (KR); Dongmyung Kim, Suwon-si (KR); Wonjun Kim, Suwon-si (KR); Sangho Lee, Suwon-si (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 336 days.

(21) Appl. No.: 18/496,450

(22) Filed: Oct. 27, 2023

(65) Prior Publication Data

US 2024/0162958 A1 May 16, 2024

(30) Foreign Application Priority Data

Nov. 10, 2022 (KR) ........................ 10-2022-0149640

(51) Int. Cl.
    *H04B 7/06* (2006.01)
    *H04B 17/318* (2015.01)
(52) U.S. Cl.
    CPC ......... *H04B 7/0626* (2013.01); *H04B 17/328* (2023.05)
(58) Field of Classification Search
    None
    See application file for complete search history.

(56) References Cited

U.S. PATENT DOCUMENTS 11,101,863 B2 8/2021 Kang et al.
11,546,034 B2 1/2023 Kim et al.
(Continued)

FOREIGN PATENT DOCUMENTS

CN       114982275 A    8/2022
KR   10-2019-0035633 A    4/2019
(Continued)

OTHER PUBLICATIONS

International Search Report dated Feb. 16, 2024, issued in International Application No. PCT/KR2023/016921.
(Continued)

*Primary Examiner* — Christine T Duong
(74) *Attorney, Agent, or Firm* — Jefferson IP Law, LLP

(57) ABSTRACT

The present disclosure relates to a 5G communication system or a 6G communication system for supporting higher data rates beyond a 4G communication system such as long term evolution (LTE). A method performed by a user equipment (UE) in a 5G or 6G communication system is provided. The method includes receiving a message including configuration information for a conditional channel state information (CSI) report from a base station, receiving multiple CSI-reference signals (RSs) on different beams from the base station, selecting at least one CSI-RS satisfying at least one of a first condition or a second condition from the multiple CSI-RSs, based on the configuration information, and transmitting the conditional CSI report including information on the at least one CSI-RS to the base station.

20 Claims, 25 Drawing Sheets

(56)  References Cited

U.S. PATENT DOCUMENTS

| | | | |
|---|---|---|---|
| 2012/0140649 | A1 | 6/2012 | Choudhury et al. |
| 2014/0003240 | A1 | 1/2014 | Chen et al. |
| 2014/0003345 | A1 | 1/2014 | Chu |
| 2018/0278301 | A1 | 9/2018 | Kim et al. |
| 2020/0403746 | A1 | 12/2020 | Cheraghi et al. |
| 2021/0044397 | A1* | 2/2021 | Khoshnevisan ...... H04L 5/0032 |
| 2021/0282115 | A1* | 9/2021 | Sengupta .............. H04L 5/0053 |
| 2021/0360460 | A1* | 11/2021 | Taherzadeh Boroujeni ................ H04B 7/0632 |
| 2022/0046726 | A1 | 2/2022 | Taherzadeh Boroujeni et al. |
| 2022/0078848 | A1 | 3/2022 | Hu et al. |
| 2022/0352953 | A1 | 11/2022 | Huang et al. |
| 2023/0344490 | A1 | 10/2023 | Kang et al. |

FOREIGN PATENT DOCUMENTS

| | | | |
|---|---|---|---|
| KR | 10-2019-0132258 | A | 11/2019 |
| WO | 2022/060014 | A1 | 3/2022 |
| WO | 2022/093086 | A1 | 5/2022 |
| WO | 2022/130289 | A1 | 6/2022 |

OTHER PUBLICATIONS

Extended European Search Report dated Oct. 13, 2025, issued in European Patent Application No. 23889003.2.

* cited by examiner

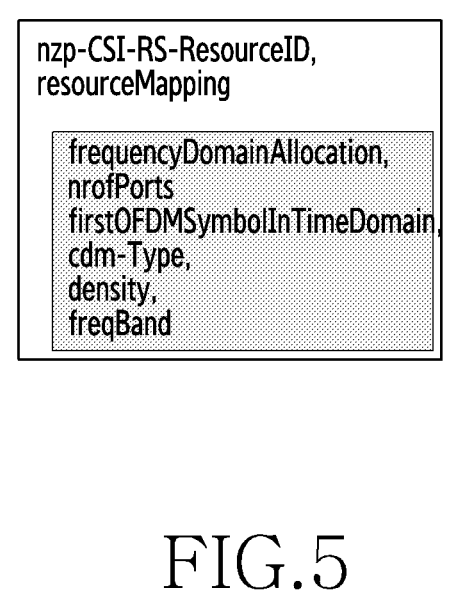

Example: number of CSI-RS ports per beam 4 port 32 port 256 port nzp-CSI-RS-ResourceID,
resourceMapping frequencyDomainAllocation,
nrofPorts
firstOFDMSymbolInTimeDomain,
cdm-Type,
density,
freqBand

FIG.5

RSRP(n)      : RSRP of CSI-RS regarding zone 1
RSRP(n+1) : RSRP of CSI-RS regarding zone 2
RSRP(n+2) : RSRP of CSI-RS regarding zone 3

| CSI-RS resource ID | Priority | Preferred RSRP range |
|---|---|---|
| n    (for zone 1) | 1st | $RSRP\_th_{min}(n) \leq RSRP(n) + powerOffset(n)$ |
| n+1 (for zone 2) | 2nd | $RSRP\_th_{min}(n+1) \leq RSRP(n+1) + powerOffset(n+1) \leq RSRP\_th_{max}(n+1)$ |
| n+2 (for zone 3) | 3rd | $RSRP(n+2)\ powerOffset(n+2) + \leq RSRP\_th_{max}(n+2)$ |

FIG.10

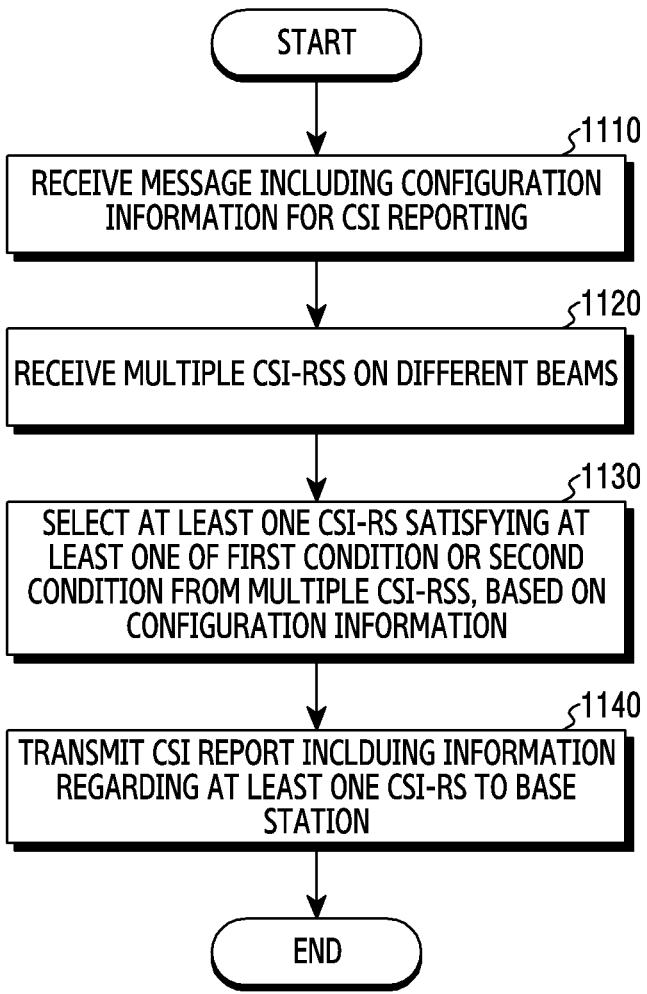

START

1110

RECEIVE MESSAGE INCLUDING CONFIGURATION INFORMATION FOR CSI REPORTING

1120

RECEIVE MULTIPLE CSI-RSS ON DIFFERENT BEAMS

1130

SELECT AT LEAST ONE CSI-RS SATISFYING AT LEAST ONE OF FIRST CONDITION OR SECOND CONDITION FROM MULTIPLE CSI-RSS, BASED ON CONFIGURATION INFORMATION

1140

TRANSMIT CSI REPORT INCLDUING INFORMATION REGARDING AT LEAST ONE CSI-RS TO BASE STATION

END

FIG.11

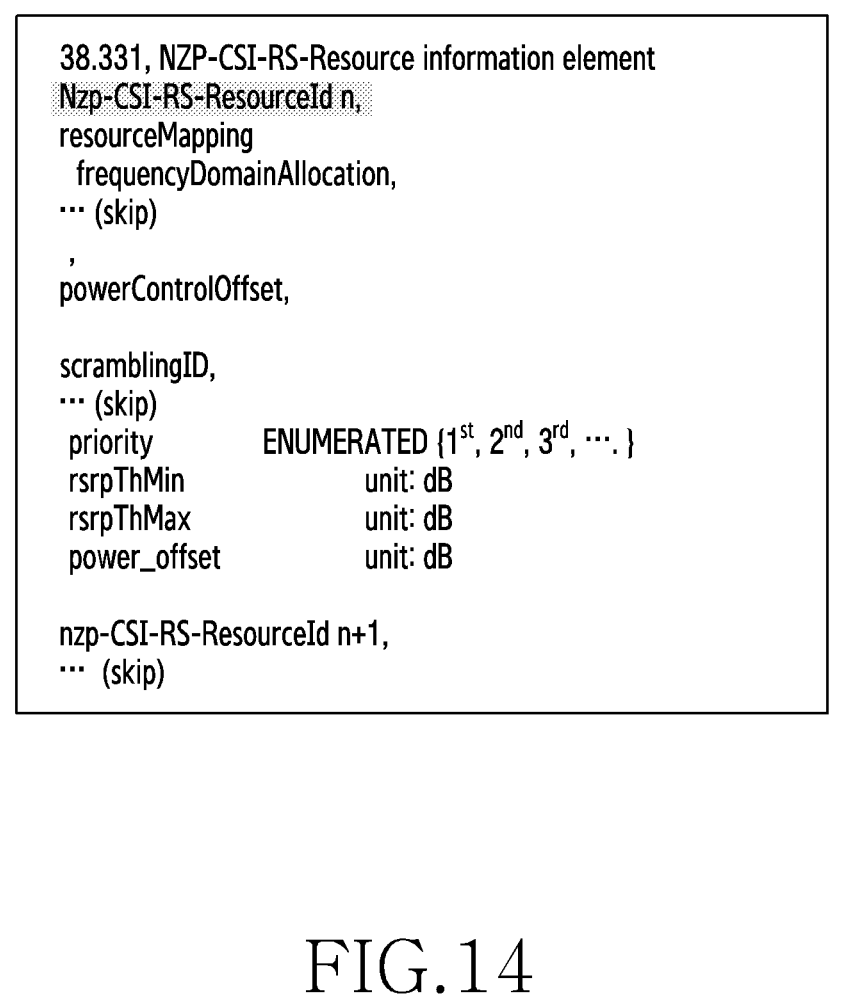

38.331, NZP-CSI-RS-Resource information element
Nzp-CSI-RS-ResourceId n,
resourceMapping
  frequencyDomainAllocation,
··· (skip)

,
powerControlOffset, scramblingID,
··· (skip)
 priority         ENUMERATED {1$^{st}$, 2$^{nd}$, 3$^{rd}$, ···. }
 rsrpThMin            unit: dB
 rsrpThMax            unit: dB
 power_offset         unit: dB nzp-CSI-RS-ResourceId n+1,
··· (skip)

FIG.14

| RRC parameter | Parameter in equation | Definition |
|---|---|---|
| priority | priority | Priority regarding CSI-RS resource ID=n (mandatory) |
| rsrpThMin (optional) | $RSRP\_th_{min}(n)$ | Lower bound of preferred RSRP regarding CSI-RS resource ID=n (if no threshold regarding lower limit is configured, there is no lower limit) If no power_offset value is configured regarding CSI-RS resource ID=n, rsrpThMin=RSRP_thmin(n)-powerOffset(n) may be configured. |
| rsrpThMax (optional) | $RSRP\_th_{max}(n)$ | Upper bound of preferred RSRP regarding CSI-RS resource ID=n (if no threshold regarding upper limit is configured, there is no upper limit) If no power_offset value is configured regarding CSI-RS resource ID=n, rsrpThMax=RSRP_thmax(n)-powerOffset(n) may be configured. |
| power_offset (optional) | powerOffset(n) | EIRP difference of CSI-RS resource, CSI-RS resource ID of which is n, compared with existing CSI-RS resource (if not configured separately, power offset value is 0dB. CSI-RS having power offset value of 0dB may be configured as reference CSI-RS resource) For example, if CSI-RS resources to be compared have identical EIRP, power_offset may not be considered |

FIG.16

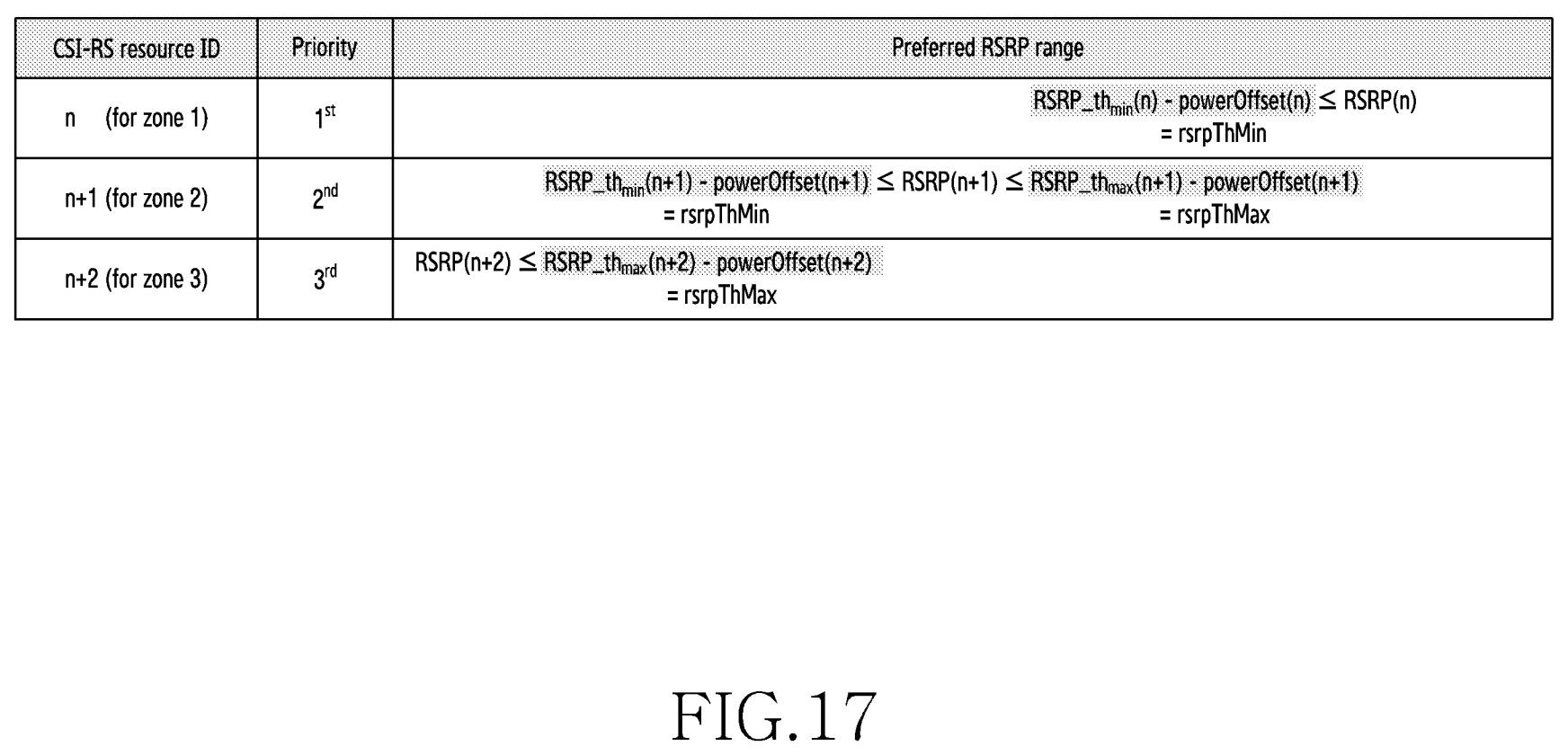

| CSI-RS resource ID | Priority | Preferred RSRP range |
|---|---|---|
| n (for zone 1) | 1st | $RSRP\_th_{min}(n) - powerOffset(n) \leq RSRP(n)$ $= rsrpThMin$ |
| n+1 (for zone 2) | 2nd | $RSRP\_th_{min}(n+1) - powerOffset(n+1) \leq RSRP(n+1) \leq RSRP\_th_{max}(n+1) - powerOffset(n+1)$ $= rsrpThMin$ $= rsrpThMax$ |
| n+2 (for zone 3) | 3rd | $RSRP(n+2) \leq RSRP\_th_{max}(n+2) - powerOffset(n+2)$ $= rsrpThMax$ |

FIG.17

| CSI-RS resource ID | Priority | Preferred RSRP range |
|---|---|---|
| n    (for zone 1) | 1st | $RSRP\_th_{min}(n) - powerOffset(n) \le RSRP(n)$ <br> $= rsrpThMin$ |
| n+1 (for zone 2) | 2nd | $RSRP(n+1) \le RSRP\_th_{max}(n+1) - powerOffset(n+1)$ <br> $= rsrpThMax$ |
| n+2 (for zone 3) | 3rd | $RSRP(n+2) \le RSRP\_th_{max}(n+2) - powerOffset(n+2)$ <br> $= rsrpThMax$ |

FIG.18

| CSI-RS resource ID | Priority | Preferred RSRP range |
|---|---|---|
| n  (for zone 1) | 1st | $RSRP\_th_{min}(n) - powerOffset(n) \le RSRP(n)$ <br> $= rsrpThMin$ |
| n+1 (for zone 2) | 2nd | $RSRP\_th_{min}(n+1) - powerOffset(n+1) \le RSRP(n+1)$ <br> $= rsrpThMin$ |
| n+2 (for zone 3) | 3rd | $RSRP(n+2) \le RSRP\_th_{max}(n+2) - powerOffset(n+2)$ <br> $= rsrpThMax$ |

FIG.19

```
csi-ReportConfigToAddModList
    reportConfigId x,
    resourcesForChannelMeasurement y,
    csi-IM-ResourcesForInterference z,
    reportConfigType        CHOICE {periodic, semiPersistentOnPUCCH,
semiPersistentOnPUSCH, aperiodic, periodicWithConditional,
semiPersistentOnPUCCHWithConditional,
semiPersistentOnPUSCHWithConditional, aperiodicWithConditional}
    ...
    numReport
```

FIG.20

| RRC parameter | Parameter in equation | Definition |
|---|---|---|
| numReport | numReport | Number of CSI reports regarding CSI-RS resource set ID = m<br>If total number CSI-RS resources inside CSI-RS resource set = N, range of numReport that can be configured is $1 \leq$ numReport $\leq$ N |
| n/a | maxNumPriority | Priority type of CSI-RS resources inside CSI-RS resource set = N = maxNumPriority |

FIG.21

| Number of zones | | 3 | 2 |
|---|---|---|---|
| CSI-RS resource ID | RRC parameter | Value | Value |
| (zone 1) n | priority | 1st | 1st |
| | rsrpThMin | x dB | z dB |
| | rsrpThMax | No configuration | No configuration |
| | power_offset | EIRP of ID n+2 - EIRP of ID n | EIRP of ID n+1 - EIRP of ID n |
| (zone 2) n+1 | priority | 2nd | 2nd |
| | rsrpThMin | y dB | No configuration |
| | rsrpThMax | x dB | z dB |
| | power_offset | EIRP of ID n+1 - EIRP of ID n | 0 dB (Reference) |
| (zone 3) n+2 | priority | 3rd | n/a |
| | rsrpThMin | No configuration | |
| | rsrpThMax | y dB | |
| | power_offset | 0 dB (Reference) | |

FIG.22

| CSI-RS resource ID | Priority | referred RSRP condition (range of measured RSRP and offset) ← Weak                                                 Strong→ |
|---|---|---|
| n    (zone 1) | 1st | |
| n+1 (zone 2) | 1st | |
| n+2 (zone 3) | 2nd | |

FIG.23

METHOD AND APPARATUS FOR REPORTING CSI IN WIRELESS COMMUNICATION SYSTEM

CROSS-REFERENCE TO RELATED APPLICATION(S)

This application is based on and claims priority under 35 U.S.C. § 119(a) of a Korean patent application number 10-2022-0149640, filed on Nov. 10, 2022, in the Korean Intellectual Property Office, the disclosure of which is incorporated by reference herein in its entirety.

BACKGROUND

1. Field

The disclosure relates to a wireless communication system. More particularly, the disclosure relates to a method and an apparatus for providing conditional channel state information (CSI) feedback in a wireless communication system.

2. Description of Related Art

Considering the development of wireless communication from generation to generation, the technologies have been developed mainly for services targeting humans, such as voice calls, multimedia services, and data services. Following the commercialization of 5G (5th generation) communication systems, it is expected that the number of connected devices will exponentially grow. Increasingly, these will be connected to communication networks. Examples of connected things may include vehicles, robots, drones, home appliances, displays, smart sensors connected to various infrastructures, construction machines, and factory equipment. Mobile devices are expected to evolve in various form-factors, such as augmented reality glasses, virtual reality headsets, and hologram devices. In order to provide various services by connecting hundreds of billions of devices and things in the 6G (6th generation) era, there have been ongoing efforts to develop improved 6G communication systems. For these reasons, 6G communication systems are referred to as beyond-5G systems.

6G communication systems, which are expected to be commercialized around 2030, will have a peak data rate of tera (1,000 giga)-level bit per second (bps) and a radio latency less than 100 µsec, and thus will be 50 times as fast as 5G communication systems and have the $\frac{1}{10}$ radio latency thereof.

In order to accomplish such a high data rate and an ultra-low latency, it has been considered to implement 6G communication systems in a terahertz (THz) band (for example, 95 gigahertz (GHz) to 3 THz bands). It is expected that, due to severer path loss and atmospheric absorption in the terahertz bands than those in mmWave bands introduced in 5G, technologies capable of securing the signal transmission distance (that is, coverage) will become more crucial. It is necessary to develop, as major technologies for securing the coverage, Radio Frequency (RF) elements, antennas, novel waveforms having a better coverage than Orthogonal Frequency Division Multiplexing (OFDM), beamforming and massive Multiple-input Multiple-Output (MIMO), Full Dimensional MIMO (FD-MIMO), array antennas, and multiantenna transmission technologies such as large-scale antennas. In addition, there has been ongoing discussion on new technologies for improving the coverage of terahertz-band signals, such as metamaterial-based lenses and antennas, Orbital Angular Momentum (OAM), and Reconfigurable Intelligent Surface (RIS).

Moreover, in order to improve the spectral efficiency and the overall network performances, the following technologies have been developed for 6G communication systems: a full-duplex technology for enabling an uplink transmission and a downlink transmission to simultaneously use the same frequency resource at the same time; a network technology for utilizing satellites, High-Altitude Platform Stations (HAPS), and the like in an integrated manner; an improved network structure for supporting mobile base stations and the like and enabling network operation optimization and automation and the like; a dynamic spectrum sharing technology via collision avoidance based on a prediction of spectrum usage; an use of Artificial Intelligence (AI) in wireless communication for improvement of overall network operation by utilizing AI from a designing phase for developing 6G and internalizing end-to-end AI support functions; and a next-generation distributed computing technology for overcoming the limit of UE computing ability through reachable super-high-performance communication and computing resources (such as Mobile Edge Computing (MEC), clouds, and the like) over the network. In addition, through designing new protocols to be used in 6G communication systems, developing mechanisms for implementing a hardware-based security environment and safe use of data, and developing technologies for maintaining privacy, attempts to strengthen the connectivity between devices, optimize the network, promote softwarization of network entities, and increase the openness of wireless communications are continuing.

It is expected that research and development of 6G communication systems in hyper-connectivity, including person to machine (P2M) as well as machine to machine (M2M), will allow the next hyper-connected experience. Particularly, it is expected that services such as truly immersive eXtended Reality (XR), high-fidelity mobile hologram, and digital replica could be provided through 6G communication systems. In addition, services such as remote surgery for security and reliability enhancement, industrial automation, and emergency response will be provided through the 6G communication system such that the technologies could be applied in various fields such as industry, medical care, automobiles, and home appliances.

In a wireless communication system, channel state information (CSI) may be used to measure the state of a channel between a terminal and a base station. The terminal may transmit CSI feedback to the base station such that the base station can select an appropriate beam. However, as a method for selecting an optimal beam more effectively, a scheme in which the terminal rather than the base station (for example, gNodeB (gNB)) self-determines the optimal beam, based on CIS received from the base station, may be considered.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method capable of effectively providing a service in a wireless communication system.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving a message including configuration information for a conditional channel state information (CSI) report from a base station, receiving multiple CSI-reference signals (RSs) on different beams from the base station, selecting at least one CSI-RS satisfying at least one of a first condition or a second condition from the multiple CSI-RSs, based on the configuration information, and transmitting the conditional CSI report including information on the at least one CSI-RS to the base station, wherein the configuration information includes information on at least one of the first condition or the second condition for the conditional CSI report, and the first condition and the second condition are different from each other.

In accordance with another aspect of the disclosure, a method performed by a base station in a wireless communication system is provided. The method includes transmitting a message including configuration information for a conditional channel state information (CSI) report to a user equipment (UE), transmitting multiple CSI-reference signals (RSs) on different beams to the UE, and receiving the conditional CSI report from the UE, based on the configuration information, wherein the configuration information includes information on at least one of a first condition or a second condition for a conditional CSI report, wherein the conditional CSI report includes information on at least one CSI-RS among the multiple CSI-RSs, wherein the at least one CSI-RS satisfies at least one of the first condition or the second condition, and wherein the first condition and the second condition are different from each other.

In accordance with another aspect of the disclosure, a user equipment (UE) in a wireless communication system is provided. The UE includes at least one transceiver and at least one processor functionally coupled to the at least one transceiver, wherein the at least one processor is configured to receive a message including configuration information for a conditional channel state information (CSI) report from a base station, receive multiple CSI-reference signals (RSs) on different beams from the base station, select at least one CSI-RS satisfying at least one of a first condition or a second condition from the multiple CSI-RSs, based on the configuration information, and transmit the conditional CSI report including information on the at least one CSI-RS to the base station, wherein the configuration information includes information on at least one of the first condition or the second condition for the conditional CSI report, and the first condition and the second condition are different from each other.

In accordance with another aspect of the disclosure, a base station in a wireless communication system is provided. The base station includes at least one transceiver and at least one processor functionally coupled to the at least one transceiver, wherein the at least one processor is configured to transmit a message including configuration information for a conditional channel state information (CSI) report to a user equipment (UE), transmit multiple CSI-reference signals (RSs) on different beams to the UE, and receive the conditional CSI report from the UE, based on the configuration information, wherein the configuration information includes information on at least one of a first condition or a second condition for a conditional CSI report, the conditional CSI report includes information on at least one CSI-RS among the multiple CSI-RSs, the at least one CSI-RS satisfies at least one of the first condition or the second condition, and the first condition and the second condition are different from each other.

Various embodiments of the disclosure provide an apparatus and a method for effectively providing a service in a wireless communication system.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates various types of channel status information-reference signal (CSI-RS) resources allocated by a base station to a terminal according to an embodiment of the disclosure;

FIG. 10 illustrates a preferred RSRP range in a wireless communication system according to an embodiment of the disclosure;

FIG. 11 illustrates a conditional CSI feedback order in a wireless communication system according to an embodiment of the disclosure;

FIG. 14 illustrates configuration information for conditional CSI feedback in a wireless communication system according to an embodiment of the disclosure;

FIG. 16 illustrates a method for configuring a preferred RSRP range in a wireless communication system according to an embodiment of the disclosure;

FIG. 17 illustrates a method for configuring a preferred RSRP range in a wireless communication system according to an embodiment of the disclosure;

FIG. 18 illustrates a method for configuring a preferred RSRP range in a wireless communication system according to an embodiment of the disclosure;

FIG. 19 illustrates a method for configuring a preferred RSRP range in a wireless communication system according to an embodiment of the disclosure;

FIG. 20 illustrates a method for configuring a conditional CSI feedback operation in a wireless communication system according to an embodiment of the disclosure;

FIG. 21 illustrates a method for configuring a conditional CSI feedback operation in a wireless communication system according to an embodiment of the disclosure;

FIG. 22 illustrates a method for configuring a conditional CSI feedback operation in a wireless communication system according to an embodiment of the disclosure; and FIG. 23 illustrates a method for configuring a conditional CSI feedback operation in a wireless communication system according to an embodiment of the disclosure.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description, terms referring to device elements (e.g., control unit, processor, artificial intelligence (AI) model, encoder, decoder, autoencoder (AE), and neural network (NN) model), terms referring to data (e.g., signal, feedback, report, reporting, information, parameter, value, bit, and codeword), and the like are illustratively used for the sake of descriptive convenience. Therefore, the disclosure is not limited by the terms as used below, and other terms having equivalent technical meanings may be used.

In the disclosure, various embodiments will be described using terms employed in some communication standards (e.g., the 3rd generation partnership project (3GPP)), but they are only for the sake of illustration. Various embodiments of the disclosure may also be applied to other communication systems through modifications.

Figure 1:
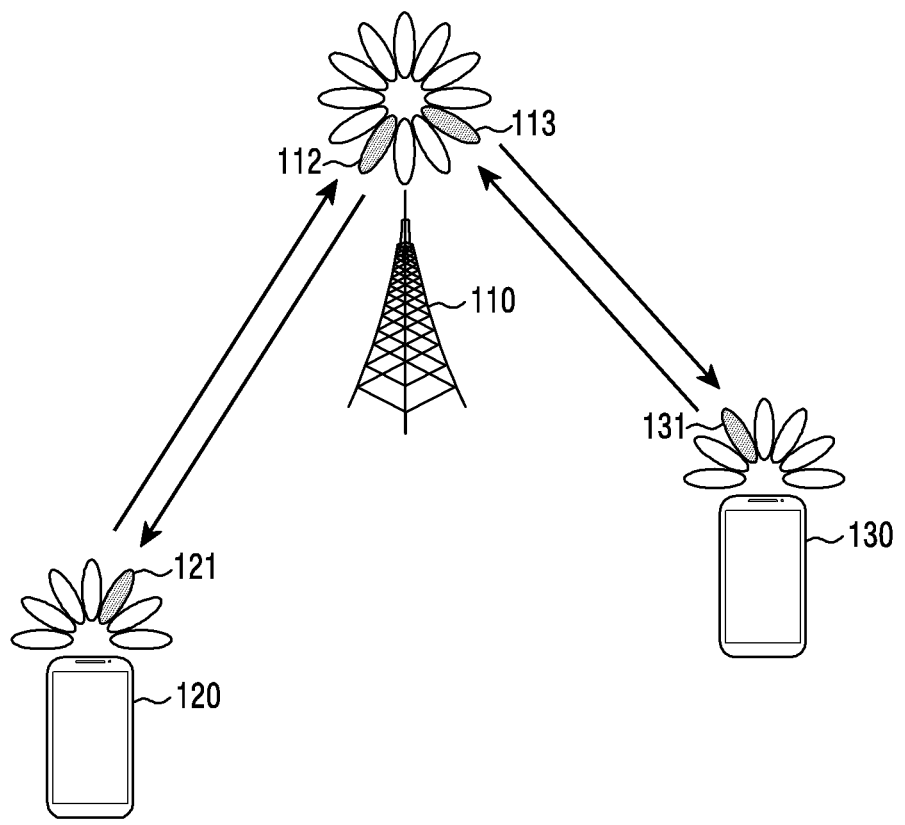
FIG. 1 illustrates an example of a wireless communication environment according to an embodiment of the disclosure.

FIG. 1 illustrates a wireless communication system according to an embodiment of the disclosure.

FIG. 1 illustrates an example of a base station 110, a terminal 120, and a terminal 130 as nodes that use a radio channel in a wireless communication system. Although FIG. 1 illustrates only one base station, base stations identical or similar to the base station 110 may be further included.

The base station 110 is a network infrastructure configured to provide wireless connection to the terminals 120 and 130. The base station 110 has coverage defined as a predetermined geographical region based on the distance to which signals can be transmitted. The base station 110 may be also be referred to as "access point (AP)", "eNodeB (eNB)", "gNodeB (gNB)", "5$^{th}$ generation node (5G node)", "6$^{th}$ generation node (6G node)", "wireless point", "transmission/reception point (TRP)", or other terms having equivalent technical meanings, in addition to "base station". Hereinafter, a base station in embodiments of the disclosure may refer to at least one of the AP, eNB, gNB, 5G node, 6G node, wireless point, or TRP.

Each of the terminal 120 and the terminal 130 refers to a device used by a user to perform communication with the base station 110 through a radio channel. In some cases, at least one of the terminal 120 and the terminal 130 may be operated without the user's intervention. That is, at least one of the terminal 120 and the terminal 130 may be a device configured to perform machine type communication (MTC) without being carried by the user. Each of the terminal 120 and the terminal 130 may also referred to as "user equipment (UE)", "mobile station", "subscriber station", "customer premises equipment (CPE)", "remote terminal", "wireless terminal", "electronic device", "user device", or other terms having equivalent technical meanings, in addition to "terminal".

The base station 110, the terminal 120, and the terminal 130 may transmit and receive radio signals in mmWave bands (e.g., 28 GHz, 30 GHz, 38 GHz, 60 GHz, over 60 GHz, and the like). The base station 110, the terminal 120, and the terminal 130 may perform beamforming to improve channel gain. Beamforming, as used herein, may include transmission beamforming and reception beamforming. That is, the base station 110, the terminal 120, and the terminal 130 may assign directivity to transmitted or received signals. To this end, the base station 110 and the terminals 120 and 130 may select serving beams 112, 113, 121, and 131 through a beam search or beam management procedure. After the serving beams 112, 113, 121, and 131 are selected, subsequent communication may be performed through resources having a quasi co-located (QCL) relation with resources used to transmit the serving beams 112, 113, 121, and 131.

Figure 2:
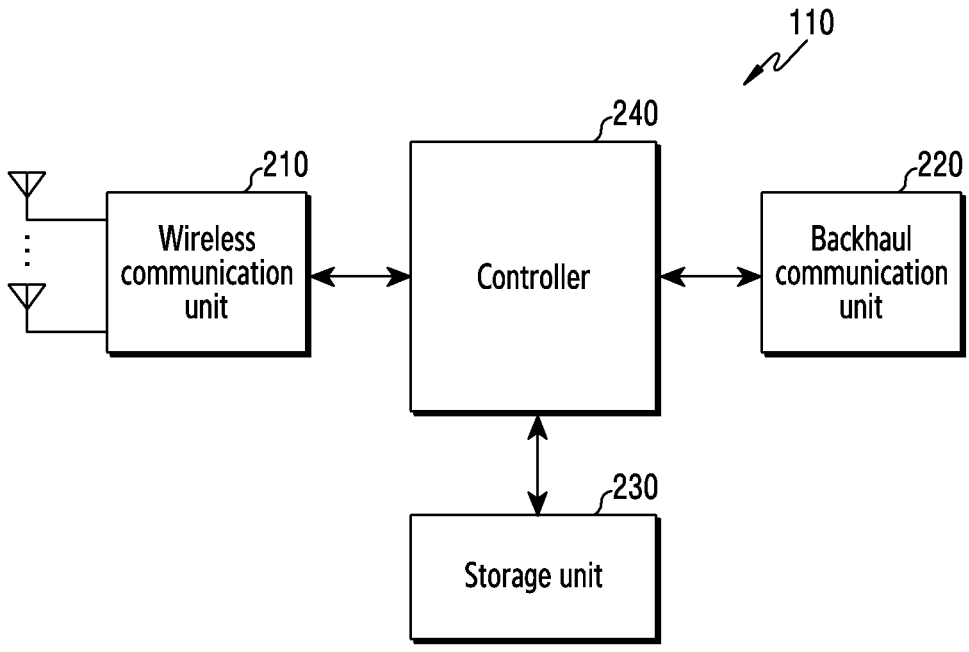
FIG. 2 illustrates an example of the configuration of a base station in a wireless communication system according to an embodiment of the disclosure.

FIG. 2 illustrates an example of the configuration of a base station in a wireless communication system according to an embodiment of the disclosure.

Referring to FIG. 2, the base station 110 may be referred to as a network for convenience of description. The configuration illustrated in FIG. 2 may be understood as the configuration of the base station 110. As used herein, terms and suffixes such as "portion" and "-er" refer to units configured to process at least one function or operation, and may be implemented as hardware, software, or a combination of hardware and software.

Referring to FIG. 2, the base station 110 includes a wireless communication portion 210, a backhaul communication portion 220, a storage portion 230, and a controller 240.

The wireless communication portion 210 performs functions for transmitting/receiving signals through a radio channel. For example, the wireless communication portion 210 performs a function for conversion between a baseband signal and a bit string according to the physical layer specification of the system. During data transmission, the wireless communication portion 210 may encode and modulate a transmitted bit string, thereby generating complex symbols. During data reception, the wireless communication portion 210 may demodulate and decode a baseband signal, thereby restoring a received bit string. In addition, the wireless communication portion 210 up-converts a baseband signal into a radio frequency (RF) band signal, transmits the RF band signal through an antenna, and down-converts an RF band signal received through the antenna into a baseband signal.

To this end, the wireless communication portion 210 may include a transmission filter, a reception filter, an amplifier, a mixer, an oscillator, a digital-to-analog (DAC) converter, an analog-to-digital (ADC) converter, and the like. The wireless communication portion 210 may include multiple transmission/reception paths. Furthermore, the wireless communication portion 210 may include at least one antenna array including multiple antenna elements. In terms of hardware, the wireless communication portion 210 may include a digital unit and an analog unit. The analog unit may include multiple sub-units according to the operating power, operating frequency, and the like.

The wireless communication portion 210 may transmit/receive signals. To this end, the wireless communication portion 210 may include at least one transceiver. For example, the wireless communication portion 210 may transmit a synchronization signal, a reference signal, system information, a message, control information, data, or the like. In addition, the wireless communication portion 210 may perform beamforming.

The wireless communication portion 210 transmits and receives signal as described above. Accordingly, all or part of the wireless communication portion 210 may be referred to as "transmitter", "receiver", or "transceiver". In addition, transmission and reception performed through a radio channel, as will be described hereinafter, will be used in a sense including the above-described processing performed by the wireless communication portion 210.

The backhaul communication portion 220 may provide an interface for performing communication with other nodes inside the network. The backhaul transceiver 220 converts bit strings transmitted from the base station 110 to other nodes, for example, other access nodes, other base stations, upper-level nodes, core networks, and the like, into physical signals and converts physical signals received from other nodes into bit strings.

The storage portion 230 stores data such as default programs for operations of the base station 110, application programs, configuration information, and the like. The storage portion 230 may include a memory. The storage portion 230 may be configured as a volatile memory, a nonvolatile memory, or a combination of a volatile memory and a nonvolatile memory. The storage portion 230 may also provide stored data at the request of the controller 240.

The controller 240 controls overall operations of the base station 110. For example, the controller 240 transmits and receives signals through the wireless communication portion 210 or the backhaul communication portion 220. In addition, the controller 240 may read and record data in the storage portion 230. The controller 240 may also perform functions of a protocol stack required by communication specifications. To this end, the controller 240 may include at least one processor.

The configuration of the base station 110 illustrated in FIG. 2 is only an example of a base station, and the example of a base station configured to perform various embodiments of the disclosure is not limited to the configuration illustrated in FIG. 2. That is, according to various embodiments, some components may be added, deleted, or changed.

Although the base station is described as a single entity in FIG. 2, the disclosure is not limited thereto. A base station according to various embodiments of the disclosure may be implemented to form an access network having a distributed deployment as well as an integrated deployment. According to embodiments of the disclosure, the base station may be distinguished into a central unit (CU) and a digital unit (DU) such that the CU is implemented to perform functions of upper layers (e.g., a radio link control (RLC), a packet data convergence protocol (PDCP), and a radio resource control (RRC)), and the DU is implemented to perform functions of lower layers (e.g., a medium access control (MAC) and a physical layer (PHY)). The DU of the base station may form beam coverage on a radio channel.

Figure 3:
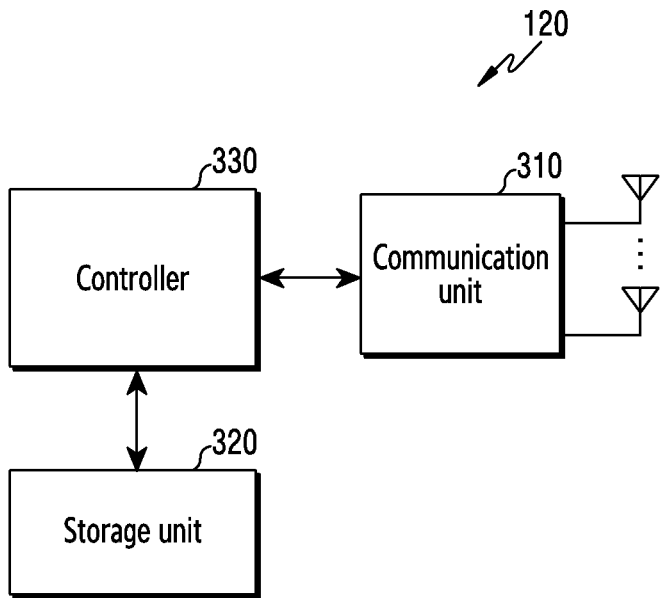
FIG. 3 illustrates an example of the configuration of a terminal in a wireless communication system according to an embodiment of the disclosure.

FIG. 3 illustrates an example of the configuration of a terminal in a wireless communication system according to an embodiment of the disclosure.

Referring to FIG. 3, the illustrated configuration may be understood as the configuration of the terminal 120 or 130. As used herein, terms and suffixes such as "portion" and "-er" refer to units configured to process at least one function or operation, and may be implemented as hardware, software, or a combination of hardware and software.

Referring to FIG. 3, the terminal 120 or 130 may include a communication portion 310, a storage portion 320, and a controller 330.

The communication portion 310 performs functions for transmitting/receiving signals through a radio channel. The communication portion 310 may perform a function for conversion between a baseband signal and a bit string according to the physical layer specification of the system. For example, during data transmission, the communication portion 310 may encode and modulate a transmitted bit string, thereby generating complex symbols. Similarly, during data reception, the communication portion 310 may demodulate and decode a baseband signal, thereby restoring a received bit string. In addition, the communication portion 310 up-converts a baseband signal into an RF band signal, transmits the RF band signal through an antenna, and down-converts an RF band signal received through the antenna into a baseband signal. The communication portion 310 may include a transmission filter, a reception filter, an amplifier, a mixer, an oscillator, a DAC, an ADC, and the like.

In addition, the communication portion 310 may include multiple transmission/reception paths. Furthermore, the communication portion 310 may include an antenna portion. The communication portion 310 may include at least one antenna array including multiple antenna elements. In terms of hardware, the communication portion 310 may include a digital circuit and an analog circuit (e.g., a radio frequency integrated circuit (RFIC)). The digital circuit and the analog circuit may be implemented as a single package. In addition, the communication portion 310 may include multiple RF chains. The communication portion 310 may perform beamforming. In order to assign directivity based on the configuration of the controller 330 to a signal to be transmitted/received, the communication portion 310 may apply a beamforming weight to the signal. According to an embodiment of the disclosure, the communication portion 310 may include a radio frequency (RF) block (or RF portion). The RF block may include a first RF circuitry related to an antenna and a second RF circuitry related to baseband processing. The first RF circuitry may be referred to as an RF-antenna (A). The second RF circuitry may be referred to as an RF-baseband (B).

In addition, the communication portion 310 may transmit/receive signals. To this end, the communication portion 310 may include at least one transceiver. The communication portion 310 may receive a downlink signal. The downlink signal may include a synchronization signal (SS), a reference signal (RS) (e.g., a cell-specific reference signal (CRS) or a demodulation (DM)-RS), system information (e.g., MIB, SIB, remaining system information (RMSI), or other system information (OSI)), a configuration message, control information, downlink data, or the like. In addition, the communication portion 310 may transmit an uplink signal. The uplink signal may include a random access-related signal (e.g., a random access preamble (RAP) (or message 1 (Msg1) or message 3 (Msg3)), a reference signal (e.g., a sounding reference signal (SRS) or a DM-RS), a power headroom report (PHR), or the like.

In addition, the communication portion 310 may include different communication modules in order to process signals in different frequency bands. Furthermore, the communication portion 310 may include multiple communication modules in order to support multiple different wireless access technologies. For example, the different wireless access technologies may include Bluetooth low energy (BLE), Wi-Fi, Wi-Fi gigabyte (WiGig), a cellular network (e.g., long term evolution (LTE) or new radio (NR)), or the like. In addition, the different frequency bands may include a super-high frequency (SHF) (e.g., 2.5 GHz or 5 GHz) band and a millimeter wave (e.g., 38 GHz, 60 GHz, or the like) band. The communication portion 310 may use the same type of wireless access technology in different frequency bands (e.g., an unlicensed band for licensed assisted access (LAA) and citizens broadband radio service (CBRS) (e.g., 3.5 GHz)).

The communication portion 310 transmits and receives signals as described above. Accordingly, all or part of the communication portion 310 may be referred to as "transmitter", "receiver", or "transceiver". In addition, transmission and reception performed through a radio channel, as will be described hereinafter, will be used in a sense including the above-described processing performed by the communication portion 310.

The storage portion 320 stores data such as default programs for operations of the terminal 120, application programs, configuration information, and the like. The storage portion 320 may be configured as a volatile memory, a nonvolatile memory, or a combination of a volatile memory and a nonvolatile memory. The storage portion 320 may also provide stored data at the request of the controller 330.

The controller 330 controls overall operations of the terminal 120 or 130. For example, the controller 330 may transmit and receive signals through the communication portion 310. The controller 330 may read and record data in the storage portion 320. The controller 330 may also perform functions of a protocol stack required by communication specifications. To this end, the controller 330 may include at least one processor. The controller 330 may include at least one processor or microprocessor, or may be a part of the processor. In addition, a part of the communication portion 310 and the controller 330 may be referred to as a cellular processor (CP). The controller 330 may include various modules for performing communication. According to various embodiments of the disclosure, the controller 330 may control the terminal so as to perform various operations described herein.

Although not illustrated in FIG. 3, according to various embodiments of the disclosure, the terminal 120 or 130 may further include a CSI selector. The CIS selector included in the terminal 120 or 130 may solely feedback CSI that satisfies a condition included in condition information received from a base station. The above-mentioned condition information (e.g., at least one of a priority condition or reference signal received power (RSRP) of a preferred reference signal) may be configured for the terminal 120 or 130 through at least one of upper-layer signal (e.g., an RRC message) or MAC layer signaling (e.g., an MAC control element (CE)) received from the base station, and the terminal 120 or 130 for which the above-mentioned condition information is configured may solely feedback CIS information corresponding to a CSI-RS that satisfies the condition included in the condition information.

According to an embodiment of the disclosure, the conditional CSI feedback operation of the terminal 120 or 130 may be performed by the controller 330 and the storage portion 320. The controller 330 may include a single processor or multiple processors. The single or multiple processors may include the function of a universal processor such as a CPU, an application processor (AP), a digital signal processor (DSP), or the like. The single or multiple processors may control the CSI feedback operation according to information configured by the base station or a predefined operation rule stored in the storage portion 320. The CSI selector 330 may not be included in the controller 330 and may be included as a separate component.

The configuration of the terminal 120 or 130 illustrated in FIG. 3 is only one example of a terminal, and a terminal configured to perform various embodiments of the disclosure is not limited to the configuration illustrated in FIG. 3. Some components may be added, deleted, or changed according to various embodiments of the disclosure. In addition, a "terminal" as will be used herein may be one of the terminals 120 and 130 illustrated in FIG. 1.

In the disclosure, a method for comparing the performance between CSI-reference signal (CSI-RS) resources having different values of effective isotropic radiated power (EIRP) and a conditional CSI feedback method is described. An operation in which a terminal reports information regarding a channel state (e.g., the result of measuring a beam or a channel for transmitting and/or receiving signals) to a base station may be referred to as CIS feedback or CSI report, and the CIS feedback and the CSI report may have the same meaning. The EIRP may refer to a value obtained by subtracting cable loss from the sum of transmission power and antenna gain. The terminal may compare the performance between CSI-RS resources (e.g., CSI-RS resources allocated to an analog beam). In order for the terminal to transmit CSI feedback to the base station based on the performance comparison, a different beamforming scheme may be applied to each cell zone. The CSI-RS resources may have different values of at least one of the port, density, beam width, or intensity of the CSI-RS resources. Each base station may operate analog beamforming and digital beamforming in a hybrid type in order to guarantee beam coverage. A hybrid type of beamforming may be used to maintain beam coverage at least equal to that of a middle band (e.g., 3.5 GHz) in an upper mid-band which is a band above the middle band (e.g., a band of 10 to 24 GHz, which is an upper mid-band).

A center zone may include coverage in a range close to a base station, and the base station may guarantee coverage through a single analog beam. In order to guarantee coverage through a single analog beam, the number of CSI-RS ports per beam may increase, and the number of antenna elements per CSI-RS port may decrease.

An edge zone may include coverage in a range distant from a base station, and the base station may guarantee coverage through multiple analog beams. In order to guarantee coverage through multiple analog beams, the number of CSI-RS ports per beam may decrease, and the number of antenna elements per CSI-RS port may increase.

Accordingly, CSI feedback overhead for beam management for each cell zone may be substantially increased. In order to reduce the CSI feedback overhead, a terminal may determine (or select/identify) beams (e.g., CSI-RS resources) having a channel state equal to/higher than a specific threshold among all pieces of CSI, and may solely transmit information regarding the selected CSI-RS resources to the base station. The terminal may determine CSI-RS resources having a channel state equal to/higher than a specific threshold among CSI-RS resources having different numbers of CSI-RS ports. Hereinafter, methods for enabling a terminal to determine CSI-RS resources having a channel state equal to/higher than a specific threshold among CSI-RS resources having different numbers of CSI-RS ports according to various embodiments will be described. Methods for enabling a terminal to transmit CSI report to the base station according to embodiments of the disclosure are also described, the CSI report including solely information regarding CSI-RS resources satisfying a specific condition among selected CSI-RS resources.

Figure 4:
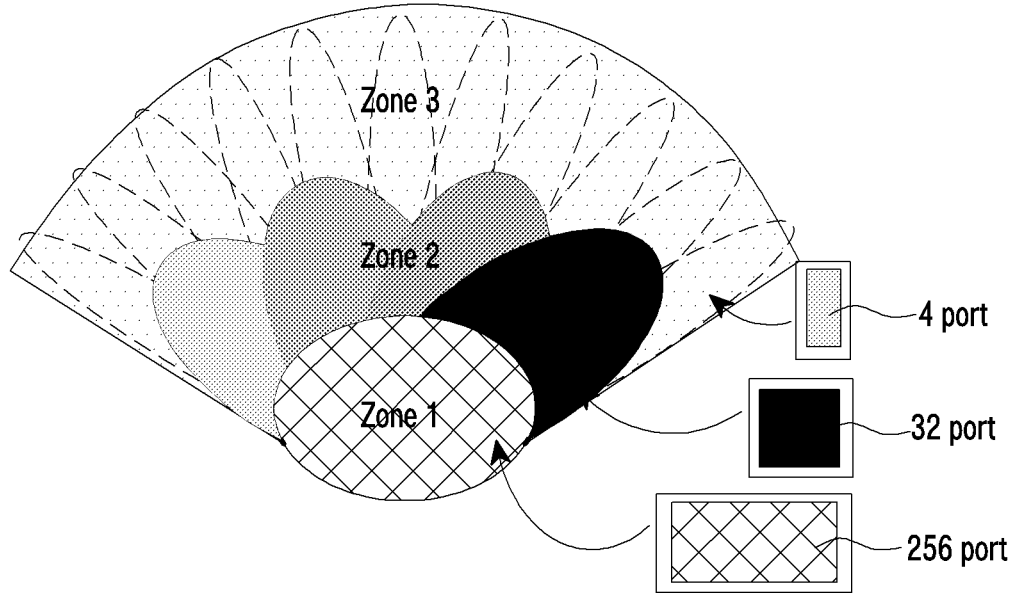
FIG. 4 illustrates a beam sweeping operation according to an embodiment of the disclosure.

FIG. 4 illustrates a beam sweeping operation according to an embodiment of the disclosure.

Referring to FIG. 4, a specific cell may be divided into a first zone (zone 1) to a third zone (zone 3), the first zone may be referred to as a center zone, the second zone may be referred to as a middle zone, and the third zone may be referred to as an edge zone, respectively. However, the division of a specific cell into zones is an example in which the terminal transmits a CSI report with regard to each cell zone, and is not limited by the embodiment illustrated in FIG. 4.

Referring to FIG. 4, different beamforming schemes may be applied to respective cell zones in a specific cell. Different types of beams (e.g., different types of CSI-RS resources) may be used in respective cell zones. The first zone may have coverage guaranteed through a single analog beam, and each beam may include 256 CSI-RS ports. The second zone may have coverage guaranteed through multiple analog beams, and each beam may include 32 CSI-RS ports. The third zone may have coverage guaranteed through a larger number of analog beams than the second zone, and each beam may include four CSI-RS ports. However, the number of CSI-RS ports included in each beam is only an example, and may be larger or smaller than the number of CSI-RS ports per beam described above. In addition, the value of at least one of the density of each analog beam, the width thereof, or the intensity thereof may differ depending on the zone.

The base station may perform digital beamforming, based on a precoding matrix (precoding beamforming). If the base station performs analog beamforming through multiple antennas, the base station may transmit a beam having a small width to a long distance in a specific direction, but it may be difficult to cover the entire cell (or a specific zone of the cell) at once. Therefore, the base station may divide coverage of the entire cell (or a specific zone of the cell) into multiple zones corresponding to the analog beam width, and may cover the entire cell (or a specific zone thereof) while successively changing (or sweeping) the beam. The above-described operation of the base station may be referred to as beam sweeping.

FIG. 5 illustrates various types of CSI-RS resources allocated by a base station to a terminal according to an embodiment of the disclosure.

Referring to FIG. 5, the base station may transmit a CSI-RS to the terminal through different types of CSI-RS resources with regard to each cell zone. The base station may configure information regarding CSI-RS resources for the terminal through upper-layer signaling (e.g., a radio resource control (RRC) message). The information regarding CSI-RS resources configured for the terminal may include at least one of frequencyDomainAllocation, nrof-Ports, firstOFDMSymbolInTimeDomain, cdm-Type, density, or freqBand. frequencyDomainAllocation may include information regarding the frequency domain to which CSI-RS resources are allocated, nrofPorts may include information regarding the number of CSI-RS ports, firstOFDMS-ymbolInTimeDomain may information regarding the time domain to which CSI-RS resources are allocated, cdm-Type may include information regarding the code division multiplexing (CDM) type of CSI-RS resources, density may include information regarding the density of CSI-RS resources, and freqBand may include information regarding the frequency band of CSI-RS resources. The EIRP of CSI-RS resources corresponding to respective zones configured by the base station (e.g., one of frequencyDomain-Allocation, nrofPorts, firstOFDMSymbolInTimeDomain, cdm-Type, density, or freqBand) may be different from each other.

In the above-described embodiment, an operation in which configuration information for a CSI report is configured for a terminal through upper-layer signaling (e.g., an RRC message) has been described, but the terminal may receive configuration information for a CSI report from the base station through at least one of MAC layer signaling (e.g., a MAC CE) or control information (e.g., downlink control information (DCI)) in addition to upper-layer signaling (e.g., an RRC message). In the following embodiments of the disclosure, configuration information may be likewise configured or indicated to the terminal.

Figure 6:
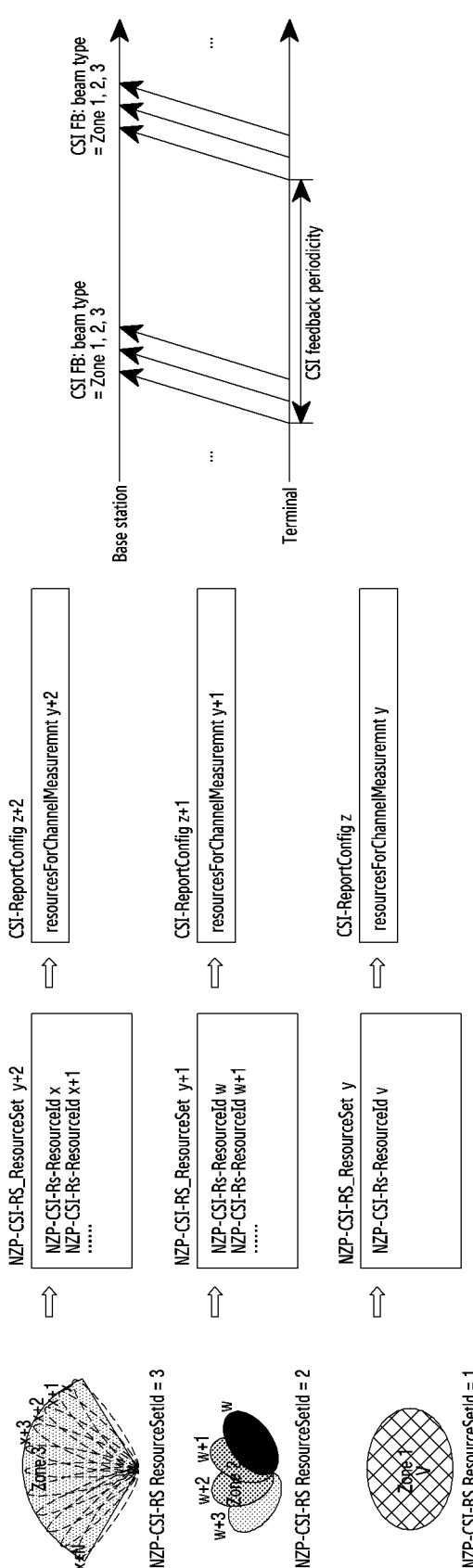
FIG. 6 illustrates a method for configuring a set of CSI-RS resources according to an embodiment of the disclosure.

FIG. 6 illustrates a method for configuring a set of CSI-RS resources according to an embodiment of the disclosure.

Referring to FIG. 6, the base station may configure a CSI-RS set including a plurality of CSI-RS resources such that the terminal selects (determines, or identifies) a CSI-RS resource having a channel state equal to/higher than a specific threshold with regard to each cell zone. The base station may configure a CSI-RS set with regard to each cell zone by the method for configuring a CSI-RS set.

According to an embodiment of the disclosure, the base station may configure a CSI-RS resource set identity (ID) (e.g., NZP-CSI-RS-ResourceSetId) with regard to of first to third zones. The NZP-CSI-RS-ResourceSetId of the first zone may be configured to be 1. Since the first zone may be covered by a single analog beam, the CSI-RS resource set (e.g., NZP-CSI-RS-ResourceSet y) corresponding to the first zone may include a single CSI-RS resource ID (e.g., NZP-CSI-RS-ResourceId={v}). The NZP-CSI-RS-Resource- SetId of the second zone may be configured to be 2. Since the second zone may be covered by multiple analog beams, the CSI-RS resource set (e.g., NZP-CSI-RS-ResourceSet y+1) corresponding to the second zone may include multiple CSI-RS resource IDs (e.g., NZP-CSI-RS-ResourceId={w, w+1, w+2, w+3}). The NZP-CSI-RS-ResourceSetId of the third zone may be configured to be 3. Since the third zone may be covered by a larger number of analog beams than the second zone, the CSI-RS resource set (e.g., NZP-CSI-RS-ResourceSet y+2) corresponding to the third zone may include multiple CSI-RS resource IDs (e.g., NZP-CSI-RS-ResourceId={x, x+1, . . . , x+N}). As used herein, N may refer to the number of analog beams radiated so as to correspond to the beam coverage.

In addition, the base station may configure, for the terminal, information regarding an uplink resource for the terminal to transmit a CSI report through upper-layer signaling (e.g., an RRC message). According to an embodiment of the disclosure, a CSI report resource (e.g., CSI-Report-Config z) regarding a CSI-RS in the first zone and a resource (e.g., resourcesForChannelMeasuremnt y) for channel measurement may be configured for the terminal. A CSI report resource (e.g., CSI-ReportConfig z+1) for a CSI-RS in the second zone and a resource (e.g., resourcesForChannelMeasuremnt y+1) for channel measurement may be configured for the terminal. A CSI report resource (e.g., CSI-Report-Config z+2) for a CSI-RS in the third zone and a resource (e.g., resourcesForChannelMeasuremnt y+2) for channel measurement may be configured for the terminal.

The terminal may need to transmit a CSI report to the base station with regard to each CSI-RS resource set. Therefore, uplink overhead may occur due to the CSI report from the terminal. Although a method is illustrated in the above-described embodiment in which the base station configures a CSI-RS resource set by using the same type of beams with regard to each cell zone, the CSI-RS resource set may not necessarily include the same type of beams. However, if the base station configures a CSI-RS resource set by using the same type of beams, the number of times the terminal transmits a CSI report may be smaller than when the CSI-RS resource set includes different types of beams. Therefore, if the CSI-RS resource set includes the same type of beams, uplink overhead may be reduced to a larger extent. As used herein, the same type of beams may refer to CSI-RS resources having the same bandwidth part (BWP) ID, density, and nrofPorts, excluding CSI-RS resources used for interference measurement.

Although a procedure is illustrated in FIG. 6 in which the terminal periodically transmits a CSI report to the base station, the above-described embodiment does not need to be limited to a periodic CSI report procedure. The base station may configure configuration information related to aperiodic CSI reporting or semi-persistent CSI reporting for the terminal through an RRC message. The terminal may transmit a CSI report to the base station, based on the configuration information, in a periodic, aperiodic, or semi-persistent manner. The operation of the terminal regarding periodic, aperiodic, or semi-persistent CSI reporting may be preconfigured for the terminal through an RRC message. Respective steps for CSI reporting according to various embodiments of the disclosure may be obviously applied to various types of CSI reporting between the terminal and the base station within a range clearly understood by a person skilled in the art. In addition, various embodiments of the disclosure may include at least one of all, some, or combinations of the operations described below, and some of the steps for periodic, semi-periodic, or semi-persistent CSI reporting can be combined within an implementable range. Hereinafter, operations for CSI reporting, including all flows of signals for periodic, aperiodic, and semi-persistent CSI reporting, may be described.

Hereinafter, a method for enabling a terminal to transmit a CSI report to a base station may be described in relation to the disclosure. The base station may receive, from the terminal, a CSI report based on a CSI-RS transmitted to the terminal. The base station may identify the state of a channel between the base station and the terminal through the CSI report, and may determine (or select) an optimal beam which maximizes the throughput. The base station may determine an optimal beam, based on at least one of a channel quality indicator (CQI), a precoding matrix indicator (PMI), or a rank indicator (RI) included in the CSI report. The terminal may estimate (measure or calculate) the CQI, based on the PMI. The terminal may select the PMI, based on a codebook received from the base station according to the RI, and may calculate the SINR, based on the PMI. The terminal may determine the CQI, based on the calculated signal to interference plus noise ratio (SINR). The PMI-based CQI determination method described above may be an operation of a codebook-based CSI reporting method. PMI-based or synchronization signal and physical broadcast channel (PBCH) block (SSB) resource indicator (SSBRI)-based beamforming may be used for codebook-based CSI reporting.

Both the PMI-based beamforming and sounding reference signal (SRS) (or transmit antenna selection (TAS))-based beamforming may be used with regard to each cell zone. The SRS-based beamforming may have a larger gain than that of the PMI-based beamforming. However, since the SRS is a reference signal transmitted from the terminal to the base station, there may be limitations (e.g., terminal power limitation) compared with the PMI-based beamforming. Therefore, a beamforming scheme expected for downlink transmission may vary with regard to each cell zone. In particular, in an upper mid-band, the coverage of the SRS may be limited according to transmission power and path loss. A beamforming scheme expected with regard to each cell zone may be classified as shown in Table 1 below:

TABLE 1

| Zone | Expected beamforming scheme for downlink transmission |
|------|-------------------------------------------------------|
| 1 | based on SRS(TAS) |
| 2 | based on SRS (TAS) and/or based on PMI |
| 3 | based on PMI and/or based on SSBRI |

Referring back to FIG. 4, the first zone has terminals closest to the base station, and there may thus be fewer limitations affecting the SRS-based beamforming. Therefore, the base station may use the SRS-based beamforming with regard to the first zone. The distance between the terminal and the base station in the second zone is larger than that in the first zone, and the SRS-based beamforming and/or the PMI-based beamforming may thus be used. The third zone has a terminal located at a cell edge, and the base station may thus use the PMI-based beamforming and/or SSBRI-based beamforming. However, the terminal is not aware of a transmission precoding weight generated by zero forcing (ZF) or singular value decomposition (SVD) precoding, and it may thus be difficult to reflect the gain of the SRS-based beamforming in the case of the CQI estimated (or calculated) by the terminal.

Figure 7:
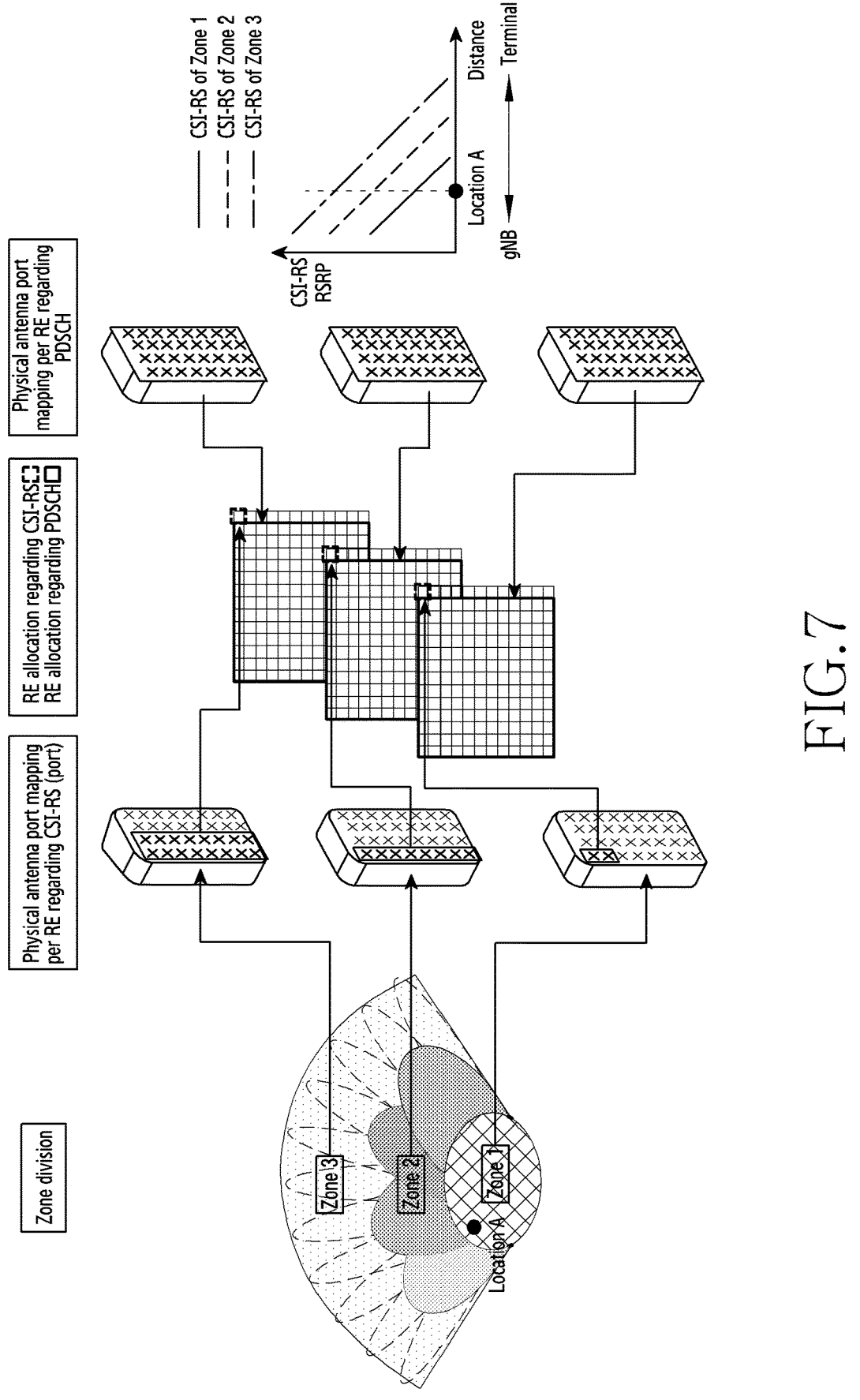
FIG. 7 illustrates the characteristics of a CSI-RS considering multiple beams in a wireless communication system according to an embodiment of the disclosure.

FIG. 7 illustrates the characteristics of a CSI-RS considering multiple beams in a wireless communication system according to an embodiment of the disclosure.

Referring to FIG. 7, the mapping relation between a physical antenna port and a beam antenna port (e.g., a logical antenna port) of each zone (e.g., one of zone, 1 zone 2, or zone 3) and the RSRP level in a specific zone (e.g., location A) may be described.

One beam in each zone may have a physical antenna port mapped thereto per resource element (RE) regarding a CSI-RS. Mapping of physical antenna ports of beams in each zone may differ from each other. For example, the number of physical antenna ports mapped per RE in the first zone may be smaller than the number of physical antenna ports mapped per RE in the second zone. The number of physical antenna ports mapped per RE in the second zone may be smaller than the number of physical antenna ports mapped per RE in the third zone. The larger the zone size, the larger number of physical antenna ports mapped per RE may become. On the other hand, the number of physical antenna ports mapped per RE regarding a downlink data channel (e.g., a physical downlink shared channel (PDSCH)) may be identical with regard to beams in all zones. Therefore, the RE allocation zone regarding a CSI-RS on a resource grid may differ in each zone, but the RE allocation zone regarding a downlink data channel (e.g., a PDSCH) may be identical in all zones.

Beams in all zones (e.g., first to third zones) may undergo the same path loss, and the number of antenna elements (AE) per CSI-RS port (e.g., logical port) may differ from each other. For example, the EIRP per CSI-RS port may differ from each other, and the EIRP of a CSI-RS corresponding to each zone may increase in the order of the first zone to the third zone. Therefore, the RSRP of a CSI-RS corresponding to a zone (e.g., the first zone) corresponding to the lowest EIRP at a fixed location (e.g., location A) may be calculated as a value lower than the RSRP of a CSI-RS corresponding to a zone (e.g., the second zone) corresponding to the highest EIRP. Therefore, in order to compare the RSRP of a CSI-RS in each zone at a specific location, an offset value for correcting the RSRP difference of the CSI-RS in each zone may be used. A method for configuring an offset in order to correct the RSRP difference of the CSI-RS in each zone will be described later in detail with reference to FIG. 9.

Figure 8:
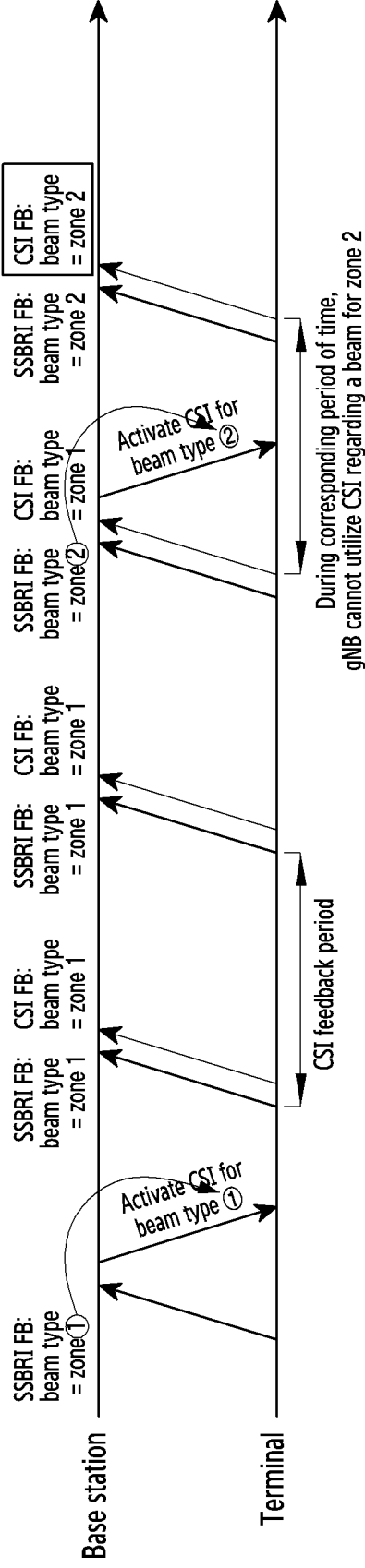
FIG. 8 illustrates a procedure for enabling a base station to select a preferred CSI report in a wireless communication system according to an embodiment of the disclosure.

FIG. 8 illustrates a procedure for enabling a base station to select a preferred CSI report in a wireless communication system according to an embodiment of the disclosure.

Referring to FIG. 8, the problem of delayed CSI feedback during a procedure in which a base station receives feedback regarding preferred CSI (e.g., the base station changes the CSI to be feedbacked) is illustrated. Assuming that a terminal performs semi-persistent or aperiodic CIS reporting during a hybrid beam (analog and digital beams) management procedure, the terminal may perform CIS reporting only once in order to reduce the overhead resulting from zone-specific CSI feedback. The base station may select a CSI report regarding a preferred CSI-RS resource among CSI-RS resources regarding respective zones. The base station may select a preferred CSI report, based on layer 1 (L1)-RSRP of an SSB. The L1-RSRP of the SSB may be transmitted through SSBRI feedback or uplink control information (e.g., uplink control information (UCI)). Therefore, in order to receive feedback regarding preferred CSI, the base station may transmit at least one of MAC layer signaling (e.g., MAC CE) or control information (e.g., DCI) to the terminal. However, CSI feedback may be delayed because the base station frequently transmits MAC layer signaling (e.g., MAC CE) or control information (e.g., DCI) to the terminal in order to receive feedback regarding preferred CSI.

The base station may receive SSBRI feedback from the terminal, and may select a preferred beam type (e.g., a beam in the first zone) based on the SSRBI feedback. The base station may activate CSI regarding the preferred beam type (e.g., a beam in the first zone) through at least one of upper-layer signaling (e.g., an RRC message) or MAC layer signaling (e.g., a MAC CE). Therefore, the terminal may transmit feedback regarding the CSI-RS selected by the base station (e.g., feedback regarding a CSI-RS corresponding to the first zone) to the base station. The terminal may periodically transmit a CSI report to the base station according to a CIS reporting scheme (e.g., a periodic or semi-persistent CSI reporting scheme). The base station may then select a different beam type (e.g., a beam in the second zone) as a preferred beam type according to SSBRI feedback received from the terminal. The base station may activate CSI regarding the preferred beam type (e.g., a beam in the second zone) through at least one of upper-layer signaling (e.g., an RRC message) or MAC layer signaling (e.g., a MAC CE). Therefore, the terminal may transmit feedback regarding the CSI-RS selected by the base station (e.g., feedback regarding a CSI-RS corresponding to the second zone) to the base station.

However, if the beam in the second zone is determined as a preferred beam type, the base station may have difficulty in utilizing the CSI of the beam regarding the second zone until CSI feedback regarding the beam in the second zone is received since the base station received CSI feedback regarding the beam in the first zone. Therefore, delay may occur until the beam in the second zone is utilized since the base station selected the beam in the second zone. Accordingly, a conditional CSI feedback method may be used as a method for reducing the delay until the beam in the second zone is utilized. According to the conditional CSI feedback method, instead of the base station selecting a preferred beam type (e.g., a CSI-RS resource corresponding to a specific zone in order to reduce delay in the CSI feedback procedure) and instructing (or configuring) the terminal to transmit CSI feedback regarding the corresponding beam type, the terminal may select a CSI-RS resource to feedback according to information preconfigured by the base station (e.g., information configured by at least one of an RRC message or a MAC CE).

According to the conditional CSI feedback method, the terminal may select (decide or identify) a CSI-RS resource to be feedbacked to the base station by using at least one of a priority condition or a preferred RSRP range. In order to select a CSI-RS resource to feedback, the terminal may consider at least one condition among a priority condition and a preferred RSRP range, and may further consider at least one additional condition other than the two above-mentioned conditions. If the terminal considers both the priority condition and preferred RSRP range in order to select a CSI-RS resource to feedback, the order of the two conditions is not limited to any specific one.

First, the priority condition may refer to the priority of a CSI-RS resource regarding which the base station wants to receive feedback from the terminal, and may be determined by considering at least one of the number of antenna ports of the CSI-RS resource, the applied beamforming scheme, or the number of terminals serviced through a beam. The priority condition may be referred to as preference, prioritization, or order, but is not limited to a specific name. In addition, the above-mentioned requirements for considering the priority condition are only examples, and are not limited by the above-mentioned examples.

Next, the preferred RSRP range may refer to the range of the RSRP level of a CSI-RS corresponding to each zone. However, each zone may have a different EIRP, and the terminal may thus configure an offset value for comparing the RSRP level of a CSI-RS corresponding to each zone. A detailed method in which the terminal compares the RSRP level of a CSI-RS corresponding to each zone will be described later with reference to FIG. 9.

According to an embodiment of the disclosure, a CSI-RS corresponding to each zone may refer to a CSI-RS transmitted through a representative CSI-RS resource of each CSI-RS resource set described with reference to FIG. 6 (e.g., a CSI-RS resource that maximizes the expected throughput). Therefore, a procedure in which the terminal selects a representative CSI-RS resource from each CSI-RS resource set may be a prerequisite.

According to another embodiment of the disclosure, a CSI-RS corresponding to each zone may refer to a CSI-RS transmitted through a beam that provides a service at the location of the terminal. Therefore, the procedure in which the terminal selects a representative CSI-RS resource from each CSI-RS resource set may not be a prerequisite.

Figure 9A:
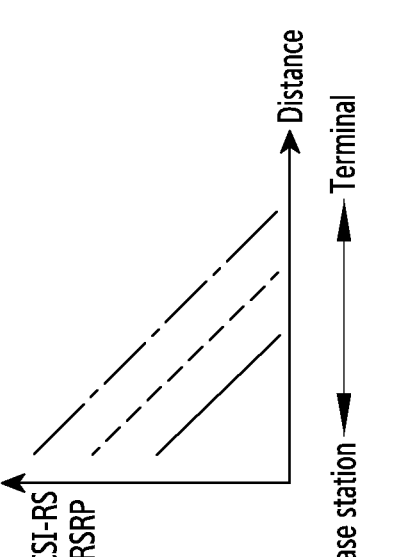
FIGS. 9A, 9B, and 9C illustrate a method for comparing the RSRP level regarding a CSI-RS corresponding to each zone in a wireless communication system according to an embodiment of the disclosure.
Figure 9B:
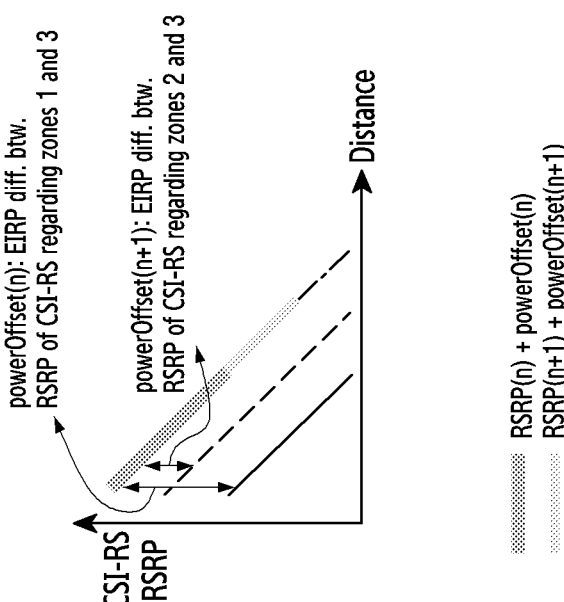
Figure 9C:
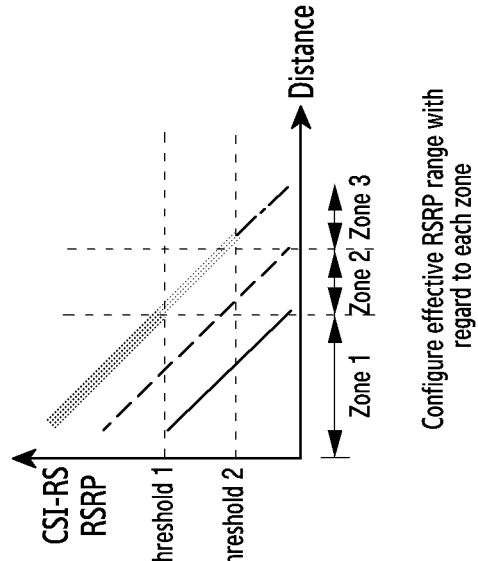

FIGS. 9A, 9B, and 9C illustrates a method for comparing the RSRP level regarding a CSI-RS corresponding to each zone in a wireless communication system according to an embodiment of the disclosure.

Referring to FIG. 9, a method for configuring an offset in order to compare the RSRP of a CSI-RS according to each zone-specific distance is described.

Referring to FIG. 9A, the RSRP level of a CSI-RS corresponding to each zone may decrease linearly according to the distance of a terminal from a base station. It may be assumed that each zone has the same path loss, the inclination of the graph may refer to path loss, and the inclination of the graph in each zone may be the same. In addition, the RSRP level of a CSI-RS corresponding to each zone at the same location may differ depending on the type of a beam that provides a service to the terminal. Therefore, each zone may be identified according to the RSRP level of a CSI-RS. In this regard, RSRP(n) may refer to the RSRP level of a CSI-RS corresponding to the first zone, RSRP(n+1) may refer to the RSRP level of a CSI-RS corresponding to the second zone, and RSRP(n+2) may refer to the RSRP level of a CSI-RS corresponding to the third zone.

According to an embodiment of the disclosure, a CSI-RS corresponding to each zone may refer to a CSI-RS transmitted through a representative CSI-RS resource of each CSI-RS resource set described with reference to FIG. 6 (e.g., a CSI-RS resource that maximizes the expected throughput). Therefore, RSRP(n) may refer to RSRP intensity regarding a representative CSI-RS, the CSI-RS resource ID of which is n.

According to another embodiment of the disclosure, a CSI-RS corresponding to each zone may refer to a CSI-RS transmitted through a beam that provides a service at the location of the terminal. Therefore, the procedure in which the terminal selects a representative CSI-RS resource from each CSI-RS resource set may not be a prerequisite. Accordingly, if CSI-RS ID transmitted through a beam that provides a service at the location of the terminal is n, RSRP(n) may refer to RSRP intensity regarding the CSI-RS resource.

Referring to FIG. 9B, each CSI-RS may have a different EIRP value, and it may thus be difficult to compare the RSRP level of each CSI-RS (e.g., the RSRP measurement value of each CSI-RS). However, the terminal may know power offset values between CSI-RSs through upper-layer signaling (e.g., an RRC message). Therefore, the terminal may compare the RSRP level of each CSI-RS by using the power offset value between CSI-RSs. powerOffset(n) may refer to a different in EIRP between CSI-RSs regarding the first and third zones. The terminal may compare the RSRP level of each CSI-RS by using the power offset value between CSI-RSs. powerOffset(n+1) may refer to a different in EIRP between CSI-RSs regarding the second and third zones. Therefore, the terminal may compare RSRPs regarding a CSI-RS corresponding to each zone having different EIRP through the sum of an RSRP value and a power offset value.

Referring to FIG. 9C, the RSRP of a CSI-RS corresponding to each zone may be compared on a single graph, and an effective RSRP range may be configured according to the distance (e.g., the range of each zone). In addition, a threshold of the maximum value or upper limit may be configured for the distance-based RSRP range, and a threshold of the minimum value or lower limit may be configured therefor. For example, a threshold regarding the lower limit may be solely configured for the RSRP range of the CSI-RS corresponding to the first zone, thresholds regarding the upper and lower limits may be configured for the RSRP range of the CSI-RS corresponding to the second zone, and a threshold regarding the upper limit may be solely configured for the RSRP range of the CSI-RS corresponding to the third zone. The threshold regarding the lower limit in the RSRP range of the CSI-RS corresponding to first zone may be identical to the threshold regarding the upper limit in the RSRP range of the CSI-RS corresponding to the second zone. In addition, the threshold regarding the lower limit in the RSRP range of the CSI-RS corresponding to second zone may be identical to the threshold regarding the upper limit in the RSRP range of the CSI-RS corresponding to the third zone. The preferred RSRP range of a CSI-RS corresponding to each zone may be configured as in the table in FIG. 10 in view of the priority.

FIG. 10 illustrates a preferred RSRP range in a wireless communication system according to an embodiment of the disclosure.

Referring to FIG. 10, assuming that a base station has preconfigured a priority condition and a preferred RSRP range in order to select a CSI-RS resource to be feedbacked by a terminal, the preferred RSRP range of each zone may be described by the following equation. According to an embodiment of the disclosure, the CSI-RS resource ID may be configured to be n, n+1, and n+2, respectively, in the zone order (e.g., in the order from the first zone to the third zone). The priority regarding a CSI-RS resource corresponding to each zone may be determined by the beamforming type according to Table 1 described above. For example, the first zone has a cell closest to the base station, and SRS-based beamforming may thus be performed. In this case, the CSI-RS resource corresponding to the first zone (e.g., a CSI-RS resource, the CSI-RS resource ID of which is n) may be given a high priority than a CSI-RS resource corresponding to a zone in which a different type of beamforming may be performed. Therefore, the priority of each zone is configured by the base station such that CSI-RS resource ID of n corresponds to the first rank, n+1 corresponds to the second rank, and n+2 corresponds to the third rank, the preferred RSRP range (or condition) of each zone may be expressed by the following equations. In embodiments of the disclosure, "preferred RSRP range" and "preferred RSRP condition" may have the same meaning.

The preferred RSRP range of each zone may include a power offset value.

$$RSRP\_th_{min}(n) \leq RSRP(n) + powerOffset(n) \qquad \text{Equation 1}$$

Equation 1 may refer to the preferred RSRP range regarding the first zone (e.g., CSI-RS resource ID=n). The preferred RSRP range regarding the first zone may include solely a threshold regarding the lower limit ($RSRP\_th_{min}(n)$) as described with reference to FIG. 9, and no threshold regarding the upper limit may thus be configured. The power offset value powerOffset(n) may refer to the EIRP different (decibel (dB) unit) of a CSI-RS resource, the CSI-RS resource ID of which is n, compared with a reference CSI-RS resource. Hereinafter, repeated descriptions of the power offset value in each zone may be omitted.

$$RSRP\_th_{min}(n+1) < RSRP(n+1) + powerOffset$$
$$(n+1) \leq RSRP\_th_{max}(n+1) \qquad \text{Equation 2}$$

Equation 2 may refer to the preferred RSRP range regarding the second zone (e.g., CSI-RS resource ID=n+1). The preferred RSRP range regarding the second zone may include both a threshold regarding the upper limit ($RSRP\_th_{max}(n+1)$) and a threshold regarding the lower limit ($RSRP\_th_{min}(n+1)$) as described with reference to FIG. 9. The power offset value powerOffset(n+1) may refer to the EIRP different of a CSI-RS resource, the CSI-RS resource ID of which is n+1, compared with a reference CSI-RS resource.

$$RSRP(n+2) + powerOffset(n+2) \leq RSRP\_th_{max}(n+2) \qquad \text{Equation 3}$$

Equation 3 may refer to the preferred RSRP range regarding the third zone (e.g., CSI-RS resource ID=n+2). The preferred RSRP range regarding the third zone may include solely a threshold regarding the upper limit ($RSRP\_th_{max}(n+2)$) as described with reference to FIG. 9, and no threshold regarding the lower limit may thus be configured. The power offset value powerOffset(n+2) may refer to the EIRP different of a CSI-RS resource, the CSI-RS resource ID of which is n+2, compared with a reference CSI-RS resource.

The above-mentioned power offset values and thresholds regarding upper and lower limits may be configured by at least one of upper-layer signaling (e.g., an RRC message) or MAC layer signaling (e.g., a MAC CE). However, if the threshold regarding the upper limit and the threshold regarding the lower limit are identical in connection with a preferred RSRP range in each zone described above, one of the thresholds may not be configured separately. The threshold regarding the upper limit and the threshold regarding the lower limit may be identical in connection with a preferred RSRP range in each zone because the same abuts an edge coverage zone of one of adjacent zones. For example, if the edge coverage zone of a specific zone abuts the edge coverage zone of another zone, $RSRP\_th_{min}(n)$ and $RSRP\_th_{max}(n+1)$ may refer to the same value. Therefore, only one of the two values may be configured for the terminal, and the other may not be configured. Likewise, $RSRP\_th_{min}(n+1)$ and $RSRP\_th_{max}(n+2)$ may refer to the same value, only one of the two values may thus be configured, and the other may not be configured. In addition, the threshold regarding the upper limit and the threshold regarding the lower limit are not necessarily identical between adjacent zones, and a similar case (e.g., the difference between the threshold regarding the upper limit and the threshold regarding the lower limit between adjacent zones is equal to/less than a specific threshold) may be included. Therefore, even if the threshold regarding the upper limit and the threshold regarding the lower limit are similar between adjacent values, one of the thresholds may be omitted to reduce the overhead resulting from configuring a separate parameter.

FIG. 11 illustrates a conditional CSI feedback order in a wireless communication system according to an embodiment of the disclosure.

Referring to FIG. 11, the order of CSI reporting operations performed by a terminal in view of the above-described priority condition and preferred RSRP range may be described.

In operation 1110, the terminal may receive a message including configuration information for CSI reporting from a base station. The configuration information for CSI reporting may be transmitted from the base station to the terminal through at least one of upper-layer signaling (e.g., an RRC message) or MAC layer signaling (e.g., a MAC CE). The configuration information for CSI reporting may include configuration values regarding CSI-RS resources and CSI reporting resources. In addition, the configuration information for CSI reporting may include configurations regarding a priority condition (e.g., information regarding the priority in each zone) and a preferred RSRP range (e.g., including a configuration value regarding at least one of a threshold regarding the upper limit for configuring the RSRP range in each zone, a threshold regarding the lower limit, or a power offset value). In addition, the configuration information for CSI reporting may include a configuration value regarding the number of CSI reports from the terminal.

In operation 1120, the terminal may receive multiple CSI-RS s on different beams, based on configuration information received from the base station. The multiple CSI-RSs received by the terminal may be included in a single CSI-RS resource set. Alternatively, the multiple CSI-RSs received by the terminal may be included in multiple CSI-RS resource sets, and the multiple CSI-RS resource sets may refer to cell zone-specific CSI-RS resource sets in the embodiment illustrated in FIG. 6.

In operation 1130, the terminal may select at least one CSI-RS included in a priority condition and/or a preferred RSRP range included in configuration information received from the base station, from multiple CSI-RSs. Although not illustrated in FIG. 11, the terminal may select a CSI-RS included in the priority condition and/or the preferred RSRP range within a configuration value range regarding the number of CSI reports from the terminal, included in configuration information received from the base station. For example, if the configuration value regarding the number of CSI reports from the terminal included in the configuration information is equal to/larger than 1, the terminal may select at least one CSI-RS included in the priority condition and/or the preferred RSRP range.

In operation 1140, the terminal may transmit a CIS report including information regarding at least one selected CSI-RS to the base station. For example, the CSI report may include at least one of CQI, RI, or PMI, and such parameters included in the CSI report may be generated (or calculated) based on the result of receiving at least one CSI-RS selected in operation 1130. In addition, in operation 1140, in addition to at least one of the CQI, RI, or PMI mentioned above, the CSI report may further include a CSI-RS resource indicator (CRI) for indicating at least one CSI-RS selected in operation 1130.

Figure 12:
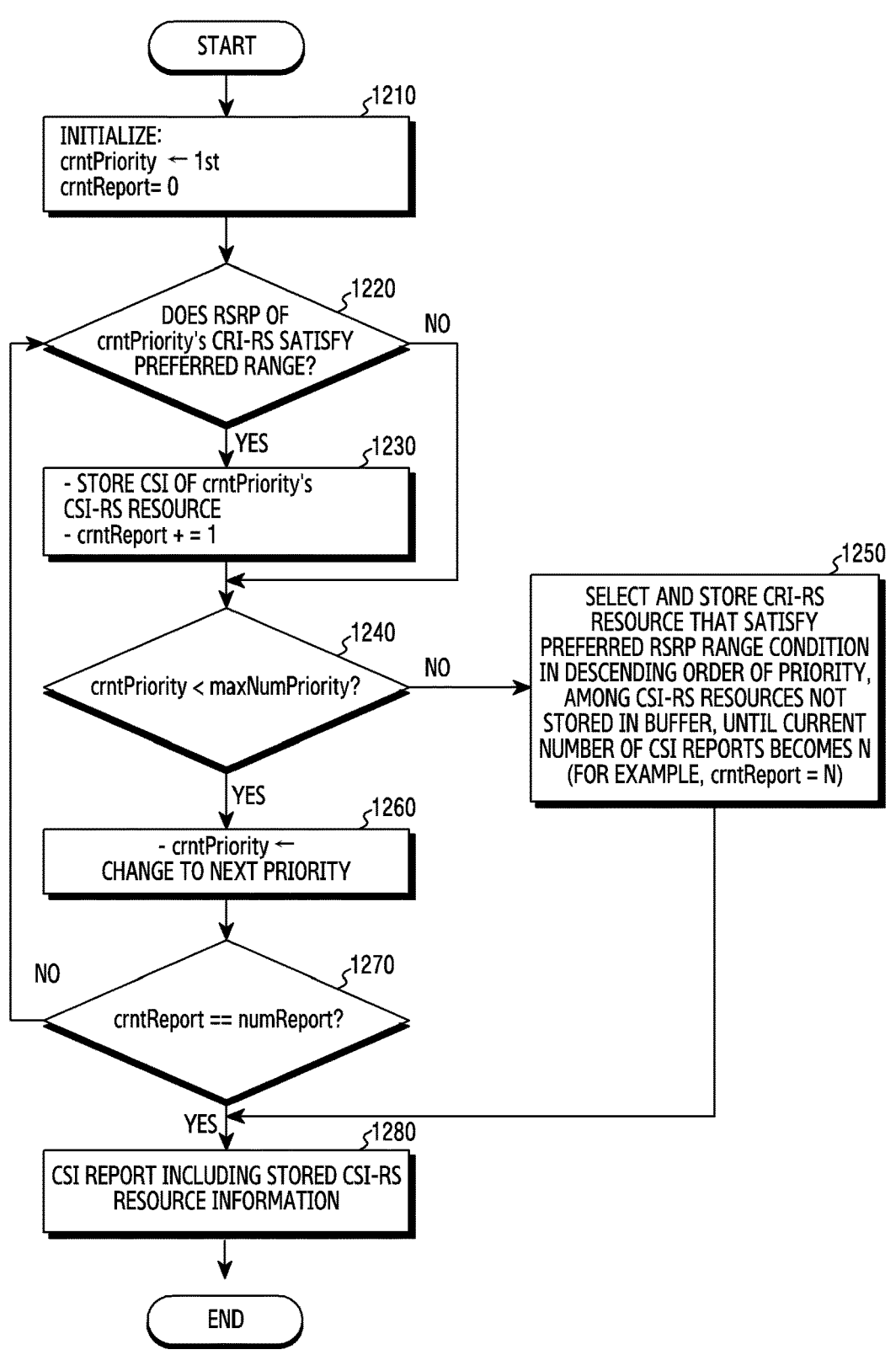
FIG. 12 illustrates a conditional CSI feedback order in a wireless communication system according to an embodiment of the disclosure.

FIG. 12 illustrates a conditional CSI feedback order in a wireless communication system according to an embodiment of the disclosure.

Referring to FIG. 12, a conditional CSI feedback operation by a terminal, assuming that the terminal first considers a priority condition, is illustrated. If there are multiple CSI-RS resources for transmitting a CSI-RS corresponding to a specific zone, the CSI-RS resources may have the same priority and may be included in a single CSI-RS resource set. If a CSI-RS resource that represents a CSI-RS resource (e.g., a representative CSI-RS resource that maximizes the expected throughput in FIG. 6) is selected, the following operations may be performed with regard to CSI-RS resources that represent each CSI-RS resource set. In addition, the order in which the priority condition and the preferred RSRP range are considered may be preconfigured for the terminal through at least one of upper-layer signaling (e.g., an RRC message) or MAC layer signaling (e.g., a MAC CE).

In operation 1210, the terminal may determine that the current priority (e.g., crntPriority) of a CSI-RS resource corresponding to a zone configured as a first rank, among selected CSI-RS resources, has a first rank. The terminal may determine that the number of CSI-RS resources selected for CSI feedback (e.g., crntReport) is 0, thereby initializing the number of CSI-RS resources selected for CSI feedback and the current priority. However, if there is no CSI-RS resource corresponding to the first zone configured as the first rank among CSI-RS resources selected by the terminal, the current priority e.g., crntPriority) may configure to be the next highest priority. For example, the terminal may initialize the current priority of the representative CSI-RS resource of the first zone, among selected representative CSI-RS resources, to the first rank, and may initialize the number of CSI-RS resources selected for CSI feedback to 0. If there is no representative CSI-RS resource of the first zone among the representative CSI-RS resources, the terminal may determine that the priority of the representative CSI-RS resource of a zone (e.g., second zone) having the next priority is the next highest priority (second rank).

In operation 1220, the terminal may determine whether the RSRP level of the CSI-RS transmitted through the CSI-RS resource configured as the first rank is included in the RSRP range. For example, the terminal may determine whether the RSRP level of the CSI-RS transmitted through the CSI-RS resource configured as the first rank is included in the RSRP range in Equation 1 described above. If the RSRP level of the CSI-RS transmitted through the CSI-RS resource configured as the first rank is included in the RSRP range in Equation 1, the terminal may perform operation 1240.

In operation 1230, if the CSI-RS transmitted through the CSI-RS resource configured as the first rank is included in the RSRP range in Equation 1 described above, the terminal may store CSI generated with regard to the CSI-RS resource configured as the first rank in a buffer. The terminal may then increase the number of CSI-RS resources selected for CSI feedback (e.g., crntReport)) by 1.

In operation 1240, the terminal may identify whether the current priority (e.g., crntPriority) is smaller than the priority type (e.g., maxNumPriority) of CSI-RS resources inside CSI-RS resource sets. The priority type of CSI-RS resources inside CSI-RS resource sets may be a value preconfigured for the terminal by at least one of upper-layer signaling (e.g., an RRC message) or MAC layer signaling (e.g., a MAC CE). For example, assuming that the current priority is 1, and that three priority types (e.g., first to third ranks) are preconfigured for the terminal, the terminal may satisfy the condition in operation 1240.

In operation 1250, if the current priority (e.g., crntPriority) is equal to the priority type (e.g., maxNumPriority) of CSI-RS resources inside CSI-RS resource sets, the terminal may perform a process of selecting and storing CSI-RS resource included in the preferred RSRP range in descending order of priority, among CSI-RS resources not stored in the buffer for CSI reporting in operation 1230, and such a process of selection and storage may be performed until the number of CSI-RS resources selected for CSI feedback becomes N (e.g., crntReport=N).

For example, assuming that the current priority is 3, and that three priority types (e.g., first to third ranks) preconfigured for the terminal have the same value, the terminal may select at least one CSI-RS resource included in the preferred RSRP range of each zone in descending order of priority from CSI-RS resources other than representative CSI-RS resources not stored in the buffer until the number of CSI-RS resources selected for CSI feedback (a value preconfigure for the terminal) is reached, and may store information regarding at least one selected CSI-RS resource in the buffer.

In operation 1260, if the number of CSI-RS resources selected for CSI feedback (e.g., crntReport) is smaller than the priority type (e.g., maxNumPriority) of CSI-RS resources inside CSI-RS resource sets, the terminal may change (or update) the current priority (e.g., crntPriority) to the next priority value. For example, assuming that the current priority is 1, and that the priority type of CSI-RS resources inside CSI-RS resource sets is 3, the terminal may change the current priority value to a value corresponding to the next priority, 2.

In operation 1270, the terminal may identify whether the number of CSI-RS resources selected for CSI feedback (e.g., numReport) has the same value as a preconfigured number of CSI reports (e.g., numReport). If the number of CSI-RS resources selected for CSI feedback (e.g., numReport) has a different value from the preconfigured number of CSI reports (e.g., numReport), the terminal 120 may resume the procedure from operation 1220. For example, the terminal may repeatedly perform operations 1220 to 1270 described above until the number of CSI-RS resources selected for CSI feedback has the same value as the preconfigured number of CSI reports, thereby selecting and storing CSI-RS resources included in the priority condition and preferred RSRP range.

In operation 1280, if the number of CSI-RS resources selected for CSI feedback (e.g., numReport) has the same value as a preconfigured number of CSI reports (e.g., numReport), or if operation 1250 described above has been performed, the terminal may transmit a CSI report including CSI stored with regard to at least one CSI-RS resource stored in the buffer to the base station.

According to an embodiment of the disclosure, although not illustrated in FIG. 12, all CSI-RS resources may be configured to have the same priority without zone distinction (e.g., without configuring a CSI-RS resource with regard to each zone), and the terminal may select solely CSI-RS resources included in the preferred RSRP range among all CSI-RS resources. The terminal may select at least one CSI-RS resource that maximizes the expected throughput, among selected CSI-RS resources, as the optimal CSI-RS resource, and may transmit a CSI report including information regarding the selected optimal CSI-RS resource to the base station.

Figure 13:
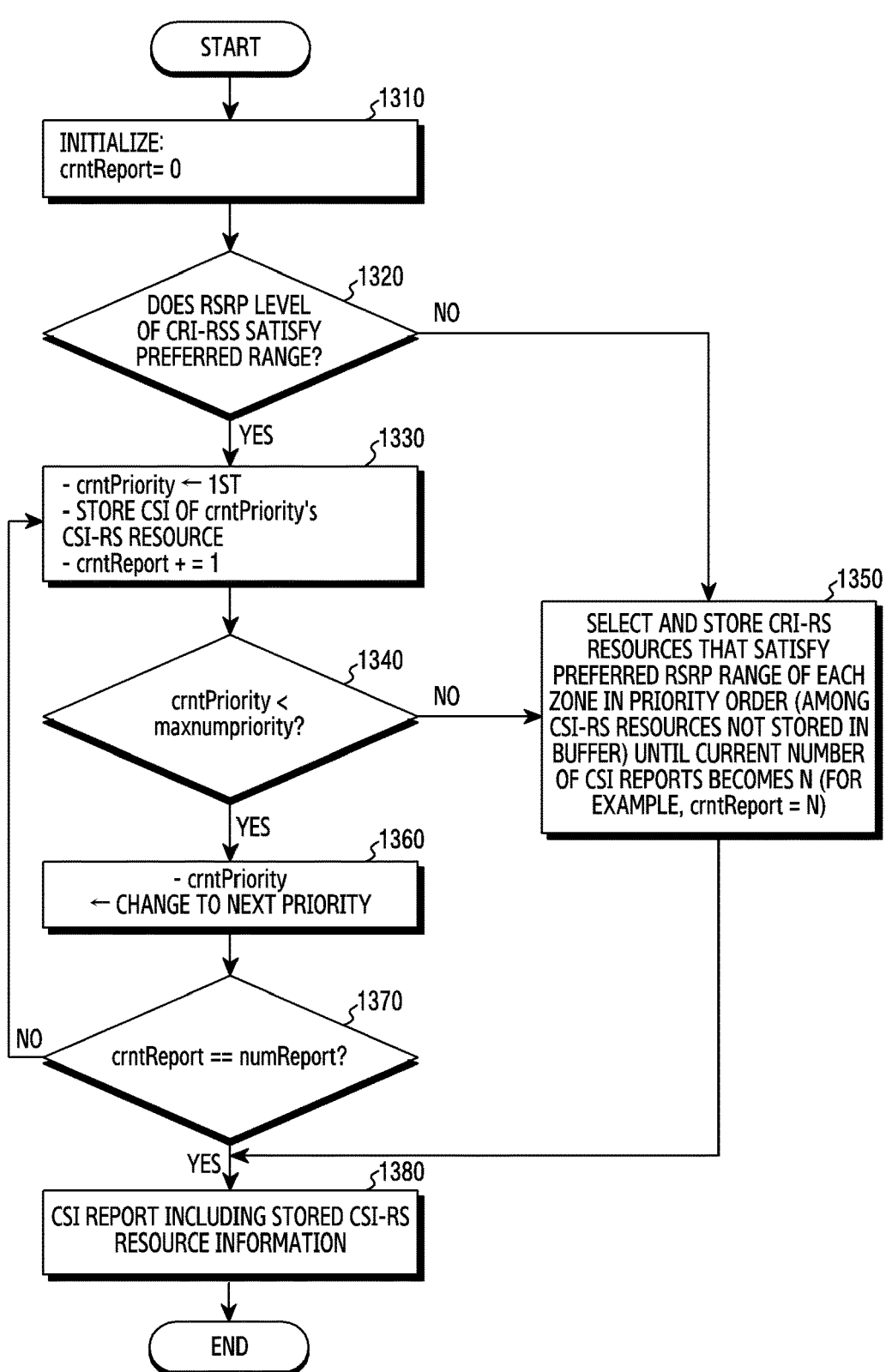
FIG. 13 illustrates a conditional CSI feedback order in a wireless communication system according to an embodiment of the disclosure.

FIG. 13 illustrates a conditional CSI feedback order in a wireless communication system according to an embodiment of the disclosure.

Referring to FIG. 13, a conditional CSI feedback operation by a terminal, assuming that the terminal first considers a preferred RSRP range, is illustrated. If there are multiple CSI-RS resources regarding a specific zone, the CSI-RS resources may have the same priority and may be included in a single CSI-RS resource set. If a CSI-RS resource that represents a CSI-RS resource set (e.g., a representative CSI-RS resource that maximizes the expected throughput in FIG. 6) is selected, the following operations may be performed with regard to CSI-RS resources that represent each CSI-RS resource set. In addition, the order in which the priority condition and the preferred RSRP range are considered may be preconfigured for the terminal through at least one of upper-layer signaling (e.g., an RRC message) or MAC layer signaling (e.g., a MAC CE).

In operation 1310, the terminal may initialize the number of CSI-RS resources selected for CSI feedback (e.g., crntReport) to 0.

In operation 1320, the terminal may determine whether the currently selected CSI-RS resources are included in the preferred RSRP range of each corresponding zone. the terminal may determine whether representative CSI-RS resources satisfy the preferred RSRP range (e.g., one of Equations 1 to 3 described above) of the zone to which each CSI-RS resource belongs. For example, the terminal may determine whether the RSRP level of the CSI-RS transmitted through each representative CSI-RS resource satisfies the RSRP range condition of each zone (e.g., one of Equations 1 to 3 described above). If there is no CSI-RS resource included in the preferred RSRP range of each zone among representative CSI-RS resources, the terminal may perform operation 1350.

In operation 1330, if there are representative CSI-RS resources included in the preferred RSRP range, the terminal may determine that the current priority (e.g., crntPriority) of a CSI-RS resource corresponding to the first-rank zone has a first rank. The terminal may store information regarding the first-rank CSI-RS resource in the buffer, and may increase the number of CSI-RS resources selected for CSI feedback (e.g., crntReport) by 1. However, if there is no CSI-RS resource corresponding to the first zone configured as the first rank among representative CSI-RS resources, the current priority (e.g., crntPriority) may configure to be the next highest priority. For example, the terminal may determine that the current priority of the representative CSI-RS resources of the first zone, among representative CSI-RS resources, is the first rank, and may increase the number of CSI-RS resources selected for CSI feedback by 1. If there is no representative CSI-RS resource of the first zone among representative CSI-RS resources, the terminal may determine that the priority of the representative CSI-RS resource of the next-rank zone (e.g., second zone) is the next highest priority (e.g., second rank).

In operation 1340, the terminal may identify whether the current priority (e.g., crntPriority) is smaller than the priority type (e.g., maxNumPriority) of CSI-RS resources inside CSI-RS resource sets. The priority type of CSI-RS resources inside CSI-RS resource sets may be a value preconfigured for the terminal by at least one of upper-layer signaling (e.g., an RRC message) or MAC layer signaling (e.g., a MAC CE). For example, assuming that the current priority is 1, and that three priority types (e.g., first to third ranks) are preconfigured for the terminal, the terminal may satisfy the condition in operation 1340.

In operation 1350, if the current priority (e.g., crntPriority) is equal to the priority type (e.g., maxNumPriority) of CSI-RS resources inside CSI-RS resource sets, the terminal may perform a process of selecting and storing CSI-RS resource included in the preferred RSRP range of each zone, among CSI-RS resources not stored in the buffer for CSI reporting in operation 1330, and such a process of selection and storage may be performed until the number of CSI-RS resources selected for CSI feedback in descending order of priority becomes N (e.g., crntReport=N). For example, assuming that the current priority is 3, and that three priority types (e.g., first to third ranks) preconfigured for the terminal have the same value, the terminal may select at least one CSI-RS resource included in the preferred RSRP range of each zone in descending order of priority from CSI-RS resources other than representative CSI-RS resources not stored in the buffer until the number of CSI-RS resources selected for CSI feedback is reached, and may store information regarding at least one selected CSI-RS resource in the buffer.

However, in operation 1320, if the RSRP level of CSI-RSs transmitted through representative CSI-RS resources is not included in the preferred RSRP range, the terminal may select and store CSI-RS resources (e.g., CSI-RS resources that maximize the expected throughput next the representative CSI-RS) included in the preferred RSRP range of each zone, among CSI-RS resources other than representative CSI-RS resources, in descending order of priority until the number of CSI-RS resources selected for CSI feedback becomes N (e.g., crntReport=N).

In operation 1360, if the number of CSI-RS resources selected for CSI feedback (e.g., crntReport) is smaller than the priority type (e.g., maxNumPriority) of CSI-RS resources inside CSI-RS resource sets, the terminal may change (or update) the current priority (e.g., crntPriority) to the next priority value. For example, assuming that the current priority is 1, and that the priority type of CSI-RS resources inside CSI-RS resource sets is 3, the terminal may change the current priority value to a value corresponding to the next priority, 2.

In operation 1370, the terminal may identify whether the number of CSI-RS resources selected for CSI feedback (e.g., numReport) has the same value as a preconfigured number of CSI reports (e.g., numReport). If the number of CSI-RS resources selected for CSI feedback (e.g., numReport) has a different value from the preconfigured number of CSI reports (e.g., numReport), the terminal may resume the procedure from operation 1330. For example, the terminal may repeatedly perform operations 1330 to 1370 described above until the number of CSI-RS resources selected for CSI feedback has the same value as the preconfigured number of CSI reports, thereby selecting CSI-RS resources included in the priority condition and preferred RSRP range.

In operation 1380, if the number of CSI-RS resources selected for CSI feedback (e.g., numReport) has the same value as a preconfigured number of CSI reports (e.g., numReport), or if operation 1350 described above has been performed, the terminal may transmit a CSI report including CSI stored with regard to at least one CSI-RS resource stored in the buffer to the base station.

FIG. 14 illustrates configuration information for conditional CSI feedback in a wireless communication system according to an embodiment of the disclosure.

Referring to FIG. 14, in connection with the conditional CSI feedback method according to the embodiment described above with reference to FIGS. 12 and 13, configuration information configured for the terminal through at least one of upper-layer signaling (e.g., an RRC message) or MAC layer signaling (e.g., a MAC CE) may include information regarding a priority condition and/or a preferred RSRP range. Configuration information regarding the priority condition may be configured in "ENUMERATED" format, and may include priority of first to n th ranks (e.g., n is an integer equal to/larger than 2). The priority condition may also be confirmed in "CHOICE" format, and is not limited to "ENUMERATED" or "CHOICE" format. Configuration information regarding the preferred RSRP range may include at least one of a threshold regarding the lower limit (e.g., rsrpThMin), threshold regarding the upper limit (e.g., rsrpThMax), or a power offset value (e.g., power_off-set), and may all be configured in dB unit.

the priority condition and the preferred RSRP range may be configured differently with regard to each CSI-RS resource ID.

According to an embodiment of the disclosure, although not illustrated in FIG. 14, the priority condition and the preferred RSRP range may be configured differently with regard to each CSI-RS resource set in FIG. 6 (e.g., NZP-CSI-RS_ResourceSet). For example, if the terminal selects multiple CSI-RS resources from a single CSI-RS resource set, the multiple CSI-RS resources selected from the single CSI-RS resource set may have the same priority condition.

Figure 15:
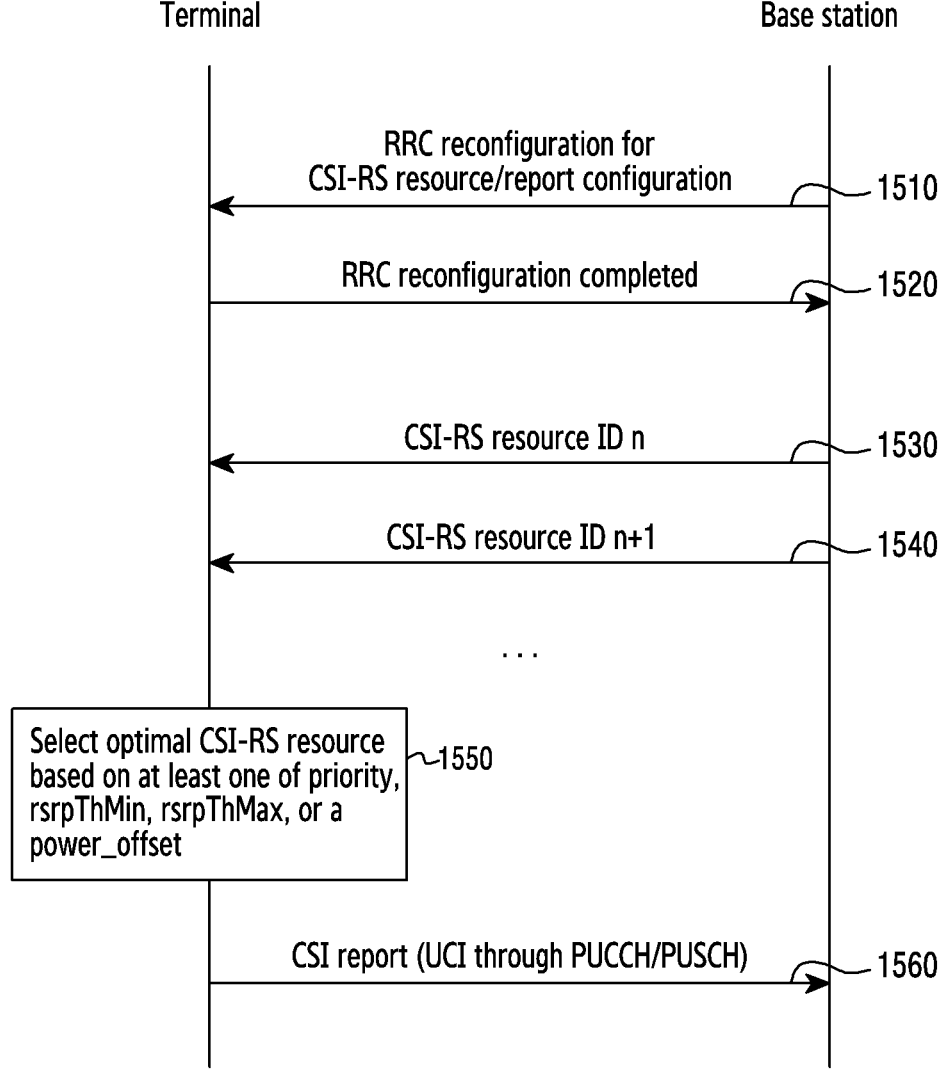
FIG. 15 illustrates a flow of signals during a conditional CSI feedback procedure in a wireless communication system according to an embodiment of the disclosure.

FIG. 15 illustrates a flow of signals during a conditional CSI feedback procedure in a wireless communication system according to an embodiment of the disclosure.

Referring to FIG. 15, a flow of signals between the base station and the terminal on connection with the conditional CSI feedback procedure described above with reference to FIGS. 12 and 13 is illustrated.

In operation 1510, the base station may transmit an RRC message (e.g., RRC reconfiguration message) including configuration information for CSI reporting and a CSI-RS to the terminal. The RRC message may include configuration information for a CSI-RS resource and configuration information for CSI reporting, respectively, and the configuration information for a CSI-RS resource and the configuration information for CSI reporting may be configured to have correspondence with each other according to a CSI framework.

In operation 1520, the terminal may transmit an RRC reconfiguration completion message to the base station in response to the RRC reconfiguration message.

In operations 1530 and 1540, the base station may successively transmit CSI-RSs to the terminal through CSI-RS resources with regard to each CSI-RS resource ID, based on configuration information included in the RRC reconfiguration message. Alternatively, the base station may transmit CSI-RSs to the terminal through CSI-RS resources with regard to each CSI-RS resource ID in a non-successively manner, based on configuration information included in the RRC reconfiguration message received in operation 1510. The method for transmitting CSI-RSs (e.g., successive or non-successive transmission) may be preconfigured for the terminal by the RRC reconfiguration message received from the base station in operation 1510.

In operation 1550, the terminal may select an optimal CSI-RS resource, based on the priority condition and/or preferred RSRP range (e.g., including at least one of a threshold regarding the lower limit, a threshold regarding the upper limit, or a power offset value) included in the RRC reconfiguration message received from the base station.

In operation 1560, the terminal may transmit a CSI report including channel state information (e.g., information regarding a channel corresponding to an optimal CSI-RS resource selected by the terminal in operation 1550) to the base station on a physical uplink control channel (PUCCH) or a physical uplink shared channel (PUSCH) through uplink control information (UCI).

FIG. 16 illustrates a method for configuring a preferred RSRP range in a wireless communication system according to an embodiment of the disclosure.

Referring to FIG. 16, a detailed method for configuring the priority condition and/or preferred RSRP range included in the configuration information for conditional CSI feedback described above with reference to FIG. 14 is illustrated. However, descriptions overlapping those in FIG. 14 may be omitted herein.

In relation to the preferred RSRP range in the table in FIG. 16, the power offset value may be included optionally in the configuration information. Therefore, referring back to FIG. 10 described above, if no power offset value is separately configured with regard to the CSI-RS, the CSI-RS resource ID of which is n, the threshold regarding the lower limit may be expressed by Equation 4 below:

$$\text{rsrpThMin}=\text{RSRP\_th}_{min}(n)-\text{powerOffset}(n) \qquad \text{Equation 4}$$

In Equation 4, the RRC parameter (or MAC CE parameter) rsrpThMin may be obtained by subtracting the power offset value (e.g., powerOffset(n)) from existing $\text{RSRP\_th}_{min}(n)$.

In addition, if no power offset value is separately configured with regard to the CSI-RS, the CSI-RS resource ID of which is n, the threshold regarding the upper limit may be expressed by Equation 5 below:

$$\text{rsrpThMax}=\text{RSRP\_th}_{max}(n)-\text{powerOffset}(n) \qquad \text{Equation 5}$$

In Equation 5, the RRC parameter (or MAC CE parameter) rsrpThMax may be obtained by subtracting the power offset value (e.g., powerOffset(n)) from existing $\text{RSRP\_th}_{max}(n)$.

The power offset value may be the EIRP difference of the CSI-RS resource, the CSI-RS resource ID of which is n, compared with the reference CSI-RS resource. The power offset value may be 0 dB if not configured separately. Therefore, a CSI-RS having the power offset value of 0 dB may be configured as the reference CSI-RS resource. However, the power offset value may not be considered if CSI-RS resources to be compared have the same EIRP.

In addition, only one of the threshold regarding the lower limit or the threshold regarding the upper limit may be included optionally. According to an embodiment of the disclosure, referring back to FIG. 12 described above, if the terminal first assesses the priority condition included in the configuration information, the configuration information regarding the preferred RSRP range may include no threshold regarding the upper limit (e.g., rsrpThMax). According to another embodiment, referring back to FIG. 13 described above, if the terminal first assesses the preferred RSRP range included in the configuration information, the configuration information regarding the preferred RSRP range may include both the threshold regarding the upper limit (e.g., rsrpThMax) and the threshold regarding the lower limit (e.g., rsrpThMin).

FIG. 17 illustrates a method for configuring a preferred RSRP range in a wireless communication system according to an embodiment of the disclosure.

Referring to FIG. 17, a preferred RSRP range may be configured according to the method for configuring thresholds regarding upper and lower limits described above with reference to FIG. 16. Referring back to FIG. 10 described above, FIG. 17 corresponds to a result of revising the preferred RSRP range in FIG. 10 according to the configuration value in FIG. 16 described above, and repeated descriptions may thus be omitted herein.

According to an embodiment of the disclosure, if no power offset value is configured separately, configuration information regarding a zone-specific preferred RSRP range may include at least one of rsrpThMin or rsrpThMax.

Specifically, configuration information of a preferred RSRP range of a CSI-RS in a first zone (e.g., if CSI-RS resource ID=n) may include solely a threshold regarding the lower limit (rsrpThMin). Configuration information of a preferred RSRP range of a CSI-RS in a second zone (e.g., if CSI-RS resource ID=n+1) may include both a threshold regarding the lower limit (rsrpThMin) and a threshold regarding the upper limit (rsrpThMax). Configuration information of a preferred RSRP range of a CSI-RS in a third zone (e.g., if CSI-RS resource ID=n+2) may include solely a threshold regarding the upper limit (rsrpThMax).

FIG. 18 illustrates a method for configuring a preferred RSRP range in a wireless communication system according to an embodiment of the disclosure.

Referring to FIG. 18, if the threshold regarding the upper limit and the threshold regarding the lower limit have the same value between adjacent zones as described above with reference to FIG. 10, only one of the thresholds may be configured, and the other may be omitted. If the threshold regarding the upper limit and the threshold regarding the lower limit are identical in a preferred RSRP range in each zone described above, then one of the thresholds does not need to be configured separately. The threshold regarding the upper limit and the threshold regarding the lower limit may be identical in a preferred RSRP range in each zone because the same abuts an edge coverage zone of one of adjacent zones. For example, rsrpThMin and rsrpThMax may have the same value between second and third zones, and one of the thresholds (e.g., if the CSI-RS resource ID is n+1, rsrpThMin) may not be configured separately. In addition, the threshold regarding the upper limit and the threshold regarding the lower limit are not necessarily identical between adjacent zones, and a similar case (e.g., the difference between the threshold regarding the upper limit and the threshold regarding the lower limit between adjacent zones is equal to/less than a specific threshold) may be included. Therefore, even if the threshold regarding the upper limit and the threshold regarding the lower limit are similar between adjacent values, one of the thresholds may be omitted to reduce the overhead resulting from configuring a separate parameter.

FIG. 19 illustrates a method for configuring a preferred RSRP range in a wireless communication system according to an embodiment of the disclosure.

Referring to FIG. 19, if the threshold regarding the upper limit and the threshold regarding the lower limit have the same value between adjacent zones as described above with reference to FIG. 10, only one of the thresholds may be configured, and the other may be omitted. In other words, if the threshold regarding the upper limit and the threshold regarding the lower limit are identical in a preferred RSRP range in each zone described above, one of the thresholds does not need to be configured separately. The threshold regarding the upper limit and the threshold regarding the lower limit may be identical in a preferred RSRP range in each zone because the same abuts an edge coverage zone of one of adjacent zones. For example, rsrpThMin and rsrpThMax may have the same value between first and second zones, and one of the thresholds (e.g., if the CSI-RS resource ID is n+1, rsrpThMax) may not be configured separately. In addition, the threshold regarding the upper limit and the threshold regarding the lower limit are not necessarily identical between adjacent zones, and a similar case (e.g., the difference between the threshold regarding the upper limit and the threshold regarding the lower limit between adjacent zones is equal to/less than a specific threshold) may be included. Therefore, even if the threshold regarding the upper limit and the threshold regarding the lower limit are similar between adjacent values, one of the thresholds may be omitted to reduce the overhead resulting from configuring a separate parameter.

FIG. 20 illustrates a method for configuring a conditional CSI feedback operation in a wireless communication system according to an embodiment of the disclosure.

Referring to FIG. 20, configurations for CSI feedback included in an RRC message (e.g., RRC reconfiguration message) may be described. A base station may configure a terminal so as to transmit CSI feedback including information regarding a CSI-RS selected according to the procedure described above with reference to FIGS. 12 and 13. The report configuration type (e.g., reportConfigType) included in the RRC message (e.g., RRC reconfiguration message) may be periodic, semi-persistent, or aperiodic. The semi-persistent CSI feedback type may be used by the base station to configure the terminal so as to perform CSI feedback through a PUCCH or PUSCH.

The report configuration type may include configuration information for conditional CSI feedback. The configuration information for conditional CSI feedback may include at least one of information for configuring a periodic conditional CSI feedback type (e.g., periodicWithConditional), a semi-persistent conditional CSI feedback type (e.g., semi-PersistentOnPUCCHWithConditional for configuring CSI feedback through a PUCCH or semiPersistentOn-PUSCHWithConditional for configuring CSI feedback through a PUSCH), or aperiodic conditional CSI feedback type (e.g., aperiodicWithConditional).

In addition, the RRC message (e.g., RRC reconfiguration message) may include configuration information regarding the number of CSI reports. For conditional CSI feedback, the base station may preconfigure the number of CSI reports (e.g., numReport) for the terminal. The number of CSI reports will be described later in detail with reference to FIG. 21.

According to an embodiment of the disclosure, the configuration information for conditional CSI feedback described above may be configured with regard to each CSI-RS resource set (e.g., CSI-RS-ResourceSetId). In an embodiment, the configuration information for conditional CSI feedback described above may be configured with regard to each CSI-RS (e.g., CSI-RS-ResourceId).

FIG. 21 illustrates a method for configuring a conditional CSI feedback operation in a wireless communication system according to an embodiment of the disclosure.

Referring to FIG. 21, the RRC parameter regarding the number of CSI reports described above with reference to FIG. 20 may refer to the number of CSI reports that the terminal can transmit to the base station, assuming that the CSI-RS resource set ID is m. If the priority type of CSI-RS resources inside CSI-RS resource sets is N, the number of CSI reports that the base station can configure may be defined by Equation 6 below:

$$1 \leq \text{numReport} \leq N \qquad \text{Equation 6}$$

In addition, the base station may configure the number of CSI reports for the terminal by considering at least one of UE capability information received from the terminal, the state of a channel with another terminal inside the cell in which the base station provides a service, or the size of a cell in which the base station provides a service. The priority type of CSI-RS resources inside CSI-RS resource sets (e.g., maxNumPriority) may be configured to be N (e.g., an integer equal to/larger than 1).

FIG. 22 illustrates a method for configuring a conditional CSI feedback operation in a wireless communication system according to an embodiment of the disclosure.

Referring to FIG. 22, a configuration table of parameter values related to a preferred RSRP range, when two or three zones exist in a cell, may be described. If the threshold regarding the upper limit and the threshold regarding the lower limit are identical in a preferred RSRP range between adjacent zones, one of the thresholds may not be configured separately. The threshold regarding the upper limit and the threshold regarding the lower limit may be identical in a preferred RSRP range in each zone because the same abuts an edge coverage zone of one of adjacent zones. In addition, in order to provide a service also to a terminal adjacent to the base station inside the cell, the threshold regarding the upper limit (e.g., rsrpThMax) of the zone (e.g., first zone) closest to the base station may not be configured. In addition, in order to provide a service also to a terminal positioned in a cell edge zone, the threshold regarding the lower limit (e.g., rsrpThMin) of the zone (e.g., third zone) farthest from the base station may not be configured.

If a CSI-RS for a specific zone is selected as a reference CSI-RS, the base station may determine that the power offset value (e.g., power_offset) of the CSI-RS resource regarding the corresponding zone is 0 dB. For example, if the CSI-RS resource regarding the third zone is selected as a reference CSI-RS, the power offset value of the first zone may be obtained by subtracting the EIRP of the first zone from the EIRP of the third zone. In addition, the power offset value of the second zone may be obtained by subtracting the EIRP of the second zone from the EIRP of the third zone.

FIG. 23 illustrates a method for configuring a conditional CSI feedback operation in a wireless communication system according to an embodiment of the disclosure.

Referring to FIG. 23, if the same priority is configured with regard to CSI-RS resource IDs having different EIRPs (e.g., having different numbers of antenna ports), the preferred RSRP range regarding CSI-RS resources having the same priority may be configured such that some zones overlap. For example, if the same priority (first rank) is given to CSI-RS resources, the CSI-RS resource ID of which is n and n+1, respectively, the RSRP range of a CSI-RS corresponding to an edge zone of the first zone may overlap the RSRP range of a CSI-RS corresponding to the boundary between the first and second zones.

According to an embodiment, referring back to FIG. 12, if multiple CSI-RS resources are included in the preferred RSRP range of Equation 1 described above in operation 1230, the terminal may select a CSI-RS resource having the largest sum of the RSRP level and the power offset (e.g., RSRP+powerOffset). In addition, in FIG. 12 (e.g., operation 1260) described above, if there is a CSI-RS resource which is included in the preferred RSRP range, and the priority of which has the same value as crntPriority among CSI-RS resources having no determined CSI report, the terminal may not update crntPriority.

According to an embodiment of the disclosure, although not illustrated in FIG. 23, operations of the terminal when performing the above-described operations in FIG. 12 with regard to all CSI-RS resources other than CSI-RS resources that represent each CSI-RS resource set may be described. The preconfigured number of CSI reports (e.g., numReport) may be larger than 1, and CSI-RS resources inside a CSI-RS resource set may have the same EIRP and priority. Referring back to FIG. 12, in operation 1230, if multiple CSI-RS resources are included in the preferred RSRP range in Equation 1 described above, the terminal may select a CSI-RS resource having the largest sum of the RSRP level and the power offset (e.g., (measured) RSRP+powerOffset). In addition, in operation 1260, if there is a CSI-RS resource which is included in the preferred RSRP range, and the priority of which has the same value as crntPriority among CSI-RS resources having no determined CSI report, the terminal may not update crntPriority. In addition, CSI reporting may be performed with regard to all of multiple CSI-RS resources corresponding to a specific zone.

In relation to UE capability, a terminal that performs an operation for conditional CSI feedback may select CSI-RS resources with reference to a preconfigured condition (e.g., at least one of a priority condition or a preferred RSRP range), and may thus need no high-performance operation processing capability. Therefore, a terminal according to embodiments of the disclosure may perform an operation for conditional CSI feedback regardless of the capability of the terminal.

A metric other than RSRP may be used in various embodiments of the disclosure. At least one of SINR or received signal strength indicator (RSSI) may be used in addition to RSRP. Therefore, if at least one of SINR or RSSI is used instead of RSRP, the offset parameter may be configured to have an offset value regarding at least one of SINR or RSSI. In addition, the preferred RSRP range may be configured as at least one of a preferred SINR range or a preferred RSSI range.

According to various embodiments of the disclosure, a method performed by a terminal in a wireless communication system may include receiving a message including configuration information for a conditional channel state information (CSI) report from a base station, receiving multiple CSI-reference signals (RS s) on different beams from the base station, selecting at least one CSI-RS satisfying at least one of a first condition or a second condition from the multiple CSI-RSs, based on the configuration information, and transmitting the CSI report including information regarding the at least one CSI-RS to the base station. The configuration information may include information regarding at least one of the first condition or the second condition for the conditional CSI report, and the first condition and the second condition may be different from each other.

In an embodiment, the first condition may be priority of the CSI report, the second condition may be the range of reference signals received power (RSRP) preferred by the base station, and the first condition and the second condition may be values preconfigured for the terminal by upper-layer signaling.

In an embodiment, the number of the at least one CSI-RS may be identical to the number of the CSI report, and the number of the CSI report may be a value preconfigured for the terminal by upper-layer signaling.

In an embodiment, the first condition may be determined based on at least one of the number of antenna ports, a beamforming scheme applied to the multiple CSI-RSs, or the number of terminals to which the different beams are serviced, respectively.

In an embodiment, the second condition may include at least one of a minimum threshold or a maximum threshold of the range of the RSRP, and the minimum threshold and the maximum threshold may have different values with regard to the different beams, respectively.

According to various embodiments of the disclosure, a method performed by a base station in a wireless communication system may include transmitting a message including configuration information for a conditional channel state information (CSI) report to a terminal, transmitting multiple
CSI-reference signals (RSs) on different beams to the ter-
minal, and a step of receiving the CSI report from the
terminal, based on the configuration information. The con-
figuration information may include information regarding at
least one of a first condition or a second condition for a
conditional CSI report, the CSI report may include infor-
mation regarding at least one CSI-RS among the multiple
CSI-RSs, the at least one CSI-RS may satisfy at least one of
the first condition or the second condition, and the first
condition and the second condition may be different from
each other.

In an embodiment, the first condition may be priority of
the CSI report, the second condition may be the range of
reference signals received power (RSRP) preferred by the
base station, and the first condition and the second condition
may be values preconfigured for the terminal by upper-layer
signaling.

In an embodiment, the number of the at least one CSI-RS
may be identical to the number of the CSI report, and the
number of the CSI report may be a value preconfigured for
the terminal by upper-layer signaling.

In an embodiment, the first condition may be determined
based on at least one of the number of antenna ports, a
beamforming scheme applied to the multiple CSI-RSs, or
the number of terminals to which the different beams are
serviced, respectively.

In an embodiment, the second condition may include at
least one of a minimum threshold or a maximum threshold
of the range of the RSRP, and the minimum threshold and
the maximum threshold may have different values with
regard to the different beams, respectively.

According to various embodiments of the disclosure, a
terminal in a wireless communication system may include at
least one transceiver and at least one processor functionally
coupled to the at least one transceiver. The at least one
processor may be configured to receive a message including
configuration information for a conditional channel state
information (CSI) report from a base station, receive mul-
tiple CSI-reference signals (RSs) on different beams from
the base station, select at least one CSI-RS satisfying at least
one of a first condition or a second condition from the
multiple CSI-RSs, based on the configuration information,
and transmit the CSI report including information regarding
the at least one CSI-RS to the base station. The configuration
information may include information regarding at least one
of the first condition or the second condition for the condi-
tional CSI report, and the first condition and the second
condition may be different from each other.

In an embodiment, the first condition may be priority of
the CSI report, the second condition may be the range of
reference signals received power (RSRP) preferred by the
base station, and the first condition and the second condition
may be values preconfigured for the terminal by upper-layer
signaling.

In an embodiment, the number of the at least one CSI-RS
may be identical to the number of the CSI report, and the
number of the CSI report may be a value preconfigured for
the terminal by upper-layer signaling.

In an embodiment, the first condition may be determined
based on at least one of the number of antenna ports, a
beamforming scheme applied to the multiple CSI-RSs, or
the number of terminals to which the different beams are
serviced, respectively.

In an embodiment, the second condition may include at
least one of a minimum threshold or a maximum threshold
of the range of the RSRP, and the minimum threshold and the maximum threshold may have different values with
regard to the different beams, respectively.

According to various embodiments of the disclosure, a
base station in a wireless communication system may
include at least one transceiver and at least one processor
functionally coupled to the at least one transceiver. The at
least one processor may be configured to: transmit a mes-
sage including configuration information for a conditional
channel state information (CSI) report to a terminal; transmit
multiple CSI-reference signals (RSs) on different beams to
the terminal; and receive the CSI report from the terminal,
based on the configuration information. The configuration
information may include information regarding at least one
of a first condition or a second condition for a conditional
CSI report, the CSI report may include information regard-
ing at least one CSI-RS among the multiple CSI-RSs, the at
least one CSI-RS may satisfy at least one of the first
condition or the second condition, and the first condition and
the second condition may be different from each other.

In an embodiment, the first condition may be priority of
the CSI report, the second condition may be the range of
reference signals received power (RSRP) preferred by the
base station, and the first condition and the second condition
may be values preconfigured for the terminal by upper-layer
signaling.

In an embodiment, the number of the at least one CSI-RS
may be identical to the number of the CSI report, and the
number of the CSI report may be a value preconfigured for
the terminal by upper-layer signaling.

In an embodiment, the first condition may be determined
based on at least one of the number of antenna ports, a
beamforming scheme applied to the multiple CSI-RSs, or
the number of terminals to which the different beams are
serviced, respectively.

In an embodiment, the second condition may include at
least one of a minimum threshold or a maximum threshold
of the range of the RSRP, and the minimum threshold and
the maximum threshold may have different values with
regard to the different beams, respectively.

The methods according to the embodiments described in
the claims or the specification of the disclosure may be
implemented in software, hardware, or a combination of
hardware and software.

As for the software, a computer-readable storage medium
storing one or more programs (software modules) may be
provided. One or more programs stored in the computer-
readable storage medium may be configured for execution
by one or more processors of an electronic device. One or
more programs may include instructions for controlling an
electronic device to execute the methods according to the
embodiments described in the claims or the specification of
the disclosure.

Such a program (software module, software) may be
stored to a random access memory, a non-volatile memory
including a flash memory, a read only memory (ROM), an
electrically erasable programmable ROM (EEPROM), a
magnetic disc storage device, a compact disc (CD)-ROM, a
digital versatile disc (DVD) or other optical storage device,
and a magnetic cassette. Alternatively, it may be stored to a
memory combining part or all of those recording media. A
plurality of memories may be included.

Also, the program may be stored in an attachable storage
device accessible via a communication network such as
internet, intranet, local area network (LAN), wide LAN
(WLAN), or storage area network (SAN), or a communica-
tion network by combining these networks. Such a storage
device may access a device which executes an embodiment of the disclosure through an external port. In addition, a separate storage device on the communication network may access the device which executes an embodiment of the disclosure.

In the specific embodiments of the disclosure, the components included in the disclosure are expressed in a singular or plural form. However, the singular or plural expression is appropriately selected according to a proposed situation for the convenience of explanation, the disclosure is not limited to a single component or a plurality of components, the components expressed in the plural form may be configured as a single component, and the components expressed in the singular form may be configured as a plurality of components.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a base station, configuration information for a conditional channel state information (CSI) report;

receiving, from the base station, a plurality of CSI-reference signals (RSS) on different beams;

selecting at least one CSI-RS resource among a plurality of CSI-RS resources corresponding to the plurality of CSI-RSs, wherein the at least one CSI-RS resource satisfies a first condition and a second condition included in the configuration information; and transmitting, to the base station, the conditional CSI report including information on the selected at least one CSI-RS resource, wherein the first condition includes a priority of the plurality of CSI-RS resource regarding which the base station want to receive feedback from the UE, and wherein the second condition is a range of reference signals received power (RSRP) preferred by the base station.

2. The method of claim 1, wherein the first condition and the second condition are included in a radio resource control (RRC) message or a medium access control (MAC) control element (CE).

3. The method of claim 1, wherein a number of the selected at least one CSI-RS resource is based on a number of for the conditional CSI report, and wherein the number for the conditional CSI report is included in the configuration information.

4. The method of claim 2, wherein the first condition is determined based on at least one of a number of antenna ports, a beamforming scheme applied to the plurality of CSI-RSs, or a number of UEs served by each of the different beams.

5. The method of claim 2, wherein the second condition includes at least one of a minimum threshold or a maximum threshold of the range of the RSRP, and wherein the minimum threshold and the maximum threshold have different values with regard to the different beams, respectively.

6. A method performed by a base station in a wireless communication system, the method comprising:

transmitting, to a user equipment (UE), configuration information for a conditional channel state information (CSI) report;

transmitting, to the UE, a plurality of CSI-reference signals (RSs) on different beams; and receiving, from the UE, the conditional CSI report based on the configuration information, wherein the configuration information includes a first condition and a second condition for the conditional CSI report, wherein the conditional CSI report includes information on at least one CSI-RS resource selected among a plurality of CSI-RS resources corresponding to the plurality CSI-RSs, wherein the selected at least one CSI-RS resource satisfies the first condition and the second condition, wherein the first condition includes a priority of the plurality of CSI-RS resource regarding which the base station want to receive feedback from the UE, and wherein the second condition is a range of reference signals received power RSRP) preferred by the base station.

7. The method of claim 6, wherein the first condition and the second condition are included in a radio resource control (RRC) message or a medium access control (MAC) control element (CE).

8. The method of claim 6, wherein a number of the selected at least one CSI-RS resource is based on a number for the conditional CSI report, and wherein the number for the conditional CSI report is included in the configuration information.

9. The method of claim 7, wherein the first condition is determined based on at least one of a number of antenna ports, a beamforming scheme applied to the plurality CSI-RSs, or a number of UEs served by each of the different beams.

10. The method of claim 7, wherein the second condition includes at least one of a minimum threshold or a maximum threshold of the range of the RSRP, and wherein the minimum threshold and the maximum threshold have different values with regard to the different beams, respectively.

11. A user equipment (UE) in a wireless communication system, the UE comprising:

at least one transceiver; and at least one processor communicatively coupled to the at least one transceiver; and at least one memory, communicatively coupled to the at least one processor, storing instructions executable by the at least one processor individually or in any combination to cause the UE to:

receive, from a base station, configuration information for a conditional channel state information (CSI) report, receive, from the base station, a plurality of CSI-reference signals (RSS) on different beams, select at least one CSI-RS resource among a plurality of CSI-RS resources corresponding to the plurality of CSI-RSs, wherein the at least one CSI-RS resource satisfies a first condition and a second condition included in the configuration information, and transmit, to the base station, the conditional CSI report including information on the selected at least one CSI-RS resource, and wherein the first condition includes a priority of the plurality of CSI-RS resource regarding which the base station want to receive feedback from the UE, and wherein the second condition is a range of reference signals received power (RSRP) preferred by the base station.

12. The UE of claim 11, wherein the first condition and the second condition are included in a radio resource control (RRC) message or a medium access control (MAC) control element (CE).

13. The UE of claim 11, wherein a number of the selected at least one CSI-RS resource is based on a number for the conditional CSI report, and wherein the number for the conditional CSI report is included in the configuration information.

14. The UE of claim 12, wherein the first condition is determined based on at least one of a number of antenna ports, a beamforming scheme applied to the plurality CSI-RSs, or a number of UEs served by each of the different beams.

15. The UE of claim 12, wherein the second condition includes at least one of a minimum threshold or a maximum threshold of the range of the RSRP, and wherein the minimum threshold and the maximum threshold have different values with regard to the different beams, respectively.

16. A base station in a wireless communication system, the base station comprising:

at least one transceiver; and at least one processor communicatively coupled to the at least one transceiver; and at least one memory, communicatively coupled to the at least one processor, storing instructions executable by the at least one processor individually or in any combination to cause the base station to:

transmit, to a user equipment (UE), configuration information for a conditional channel state information (CSI) report, transmit, to the UE, a plurality of CSI-reference signals (RSs) on different beams, and receive, from the UE, the conditional CSI report, based on the configuration information, and wherein the configuration information includes a first condition and a second condition for the conditional CSI report, wherein the conditional CSI report includes information on at least one CSI-RS resource selected among a plurality of CSI-RS resources corresponding to the plurality CSI-RSs, wherein the selected at least one CSI-RS resource satisfies the first condition and the second condition, and wherein the first condition includes a priority of the plurality of CSI-RS resource regarding which the base station want to receive feedback from the UE, and wherein the second condition is a range of reference signals received power (RSRP) preferred by the base station.

17. The base station of claim 16, wherein the first condition and the second condition are included in a radio resource control (RRC) message or a medium access control (MAC) control element (CE).

18. The base station of claim 16, wherein a number of the selected at least one CSI-RS resource is based on a number for the conditional CSI report, and wherein the number for the conditional CSI report is included in the configuration information.

19. The base station of claim 17, wherein the first condition is determined based on at least one of a number of antenna ports, a beamforming scheme applied to the plurality CSI-RSs, or a number of UEs served by each of the different beams.

20. The base station of claim 17, wherein the second condition includes at least one of a minimum threshold or a maximum threshold of the range of the RSRP, and wherein the minimum threshold and the maximum threshold have different values with regard to the different beams, respectively.

* * * * *